(12) United States Patent
Conley et al.

(10) Patent No.: US 9,723,148 B2
(45) Date of Patent: Aug. 1, 2017

(54) SYSTEMS AND METHODS FOR PREDICTING AND PROACTIVELY ADDRESSING CUSTOMER INTERACTIONS

(71) Applicant: OPTUM, INC., Minnetonka, MN (US)

(72) Inventors: Jessica Conley, Harleysville, PA (US); Livio Ciaralli, North Wales, PA (US); Rajesh Ravindran, Ambler, PA (US); Edward Smeal, Willow Grove, PA (US)

(73) Assignee: OPTUM, INC., Minnetonka, MN (US)

( * ) Notice: Subject to any disclaimer, the term of this patent is extended or adjusted under 35 U.S.C. 154(b) by 0 days.

(21) Appl. No.: 14/727,250

(22) Filed: Jun. 1, 2015

(65) Prior Publication Data

US 2016/0352904 A1 Dec. 1, 2016

(51) Int. Cl.
*H04M 3/00* (2006.01)
*H04M 5/00* (2006.01)
*H04M 3/51* (2006.01)
*G06Q 30/00* (2012.01)
*H04M 3/523* (2006.01)
*G06Q 30/02* (2012.01)

(52) U.S. Cl.
CPC ........ *H04M 3/5191* (2013.01); *G06Q 30/016* (2013.01); *G06Q 30/0204* (2013.01); *H04M 3/5235* (2013.01); *H04M 2203/555* (2013.01)

(58) Field of Classification Search
CPC . H04M 3/5238; H04M 3/5166; H04M 3/5192
USPC ...... 379/265.1, 266.08, 242, 265.11, 265.13, 379/212.01, 211.01, 273, 264
See application file for complete search history.

(56) References Cited

U.S. PATENT DOCUMENTS

| | | | | |
|---|---|---|---|---|
| 8,615,419 | B2 * | 12/2013 | Eilam | G06Q 10/06 705/7.29 |
| 2007/0061468 | A1 * | 3/2007 | Kelly | G06Q 10/10 709/227 |
| 2016/0005049 | A1 * | 1/2016 | Menezes | G06Q 30/016 705/7.28 |

* cited by examiner

*Primary Examiner* — Thjuan K Addy
(74) *Attorney, Agent, or Firm* — Brian L. Michaelis; Seyfarth Shaw LLP

(57) ABSTRACT

The present application discloses systems and methods for systematically identifying situations, improving processes, and producing proactive, actionable results to address customer inquiries. The systems and methods produce actionable proactive results (i.e., actions to be taken by predicting a likelihood of a customer interacting with an organization, such as an insurance provider). This allows an organization to avoid unnecessary and/or repeat customer contacts and inquiries, which generate protracted work and the need for case management and escalations. In addition, the systems and methods improve first contact resolution metrics and customer experience, by predicting the need for an interaction without having to communicate with the customer.

18 Claims, 23 Drawing Sheets

FIG. 5

| Variable | Non-Case | | Case | |
|---|---|---|---|---|
| | Mean | Median | Mean | Median |
| Inbound Calls Past 12 Months | 2.55 | 2 | 6.58 | 5 |
| Inbound Calls Past 30 Days | 0.39 | 0 | 1.38 | 1 |
| Family Member Touchpoints (Past 12 Months; Not Including Spouse) | 0.47 | 0 | 1.34 | 0 |
| Times Transferred in Past 12 months | 0.87 | 0 | 3.22 | 2 |
| Privacy Related Touchpoints in Past 12 Months | 0.27 | 0 | 0.79 | 0 |
| Billing Related Touchpoints in Past 12 Months | 0.94 | 0 | 3.30 | 1 |
| Enrollment Related Touchpoints in Past 12 Months | 0.24 | 0 | 1.01 | 0 |

FIG. 6

| Variable | Non-Case | | Case | |
|---|---|---|---|---|
| | Mean | Median | Mean | Median |
| Age | 68.14 | 70 | 67.20 | 70 |
| Activities Past 12 Months | 4.17 | 3 | 12.17 | 9 |
| Touchpoints Past 12 Months | 5.63 | 4 | 13.54 | 10 |
| Web Touchpoints Past 12 Months | 0.26 | 0 | 0.67 | 0 |
| IVR Touchpoints Past 12 Months | 1.32 | 0 | 2.22 | 1 |
| Outbound Touchpoints Past 12 Months | 0.05 | 0 | 0.55 | 0 |
| Provider Touchpoints Past 12 Months | 1.27 | 0 | 1.62 | 0 |
| Family Member Touchpoints (Past 12 Months; Not Including Spouse) | 0.23 | 0 | 0.74 | 0 |
| Claims Related Touchpoints in Past 12 Months | 0.87 | 0 | 1.67 | 0 |
| Plan Benefit Related Touchpoints in Past 12 Months | 1.49 | 1 | 2.57 | 2 |
| Inbound Calls Past 24 Hours | 0.10 | 0 | 0.26 | 0 |
| Inbound Calls Past 48 Hours | 0.11 | 0 | 0.32 | 0 |
| Inbound Calls Past 72 Hours | 0.12 | 0 | 0.36 | 0 |
| Inbound Calls Past 7 Days | 0.17 | 0 | 0.58 | 0 |
| Inbound Calls Past 14 Days | 0.25 | 0 | 0.85 | 0 |
| Times Renewed Membership | 5.30 | 5 | 5.26 | 5 |

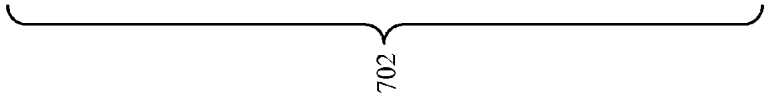

FIG. 7

| Variable | Non-Case | Case | Index |
|---|---|---|---|
| Within +/- 6 months of Age 65 | 4.95% | 4.03% | 0.81 |
| 3 or More Calls in Past 24 Hours | 0.17% | 1.26% | 7.33 |
| 3 or More Calls in Past 48 Hours | 0.23% | 1.87% | 8.02 |
| 3 or More Calls in Past 72 Hours | 0.28% | 2.32% | 8.14 |
| Experienced a Transfer in Past 12 Months | 41.20% | 81.39% | 1.98 |
| 1 or More Web Touchpoints in Past 12 Months | 4.74% | 7.87% | 1.66 |
| 1 or More IVR Touchpoints in Past 12 Months | 43.93% | 60.86% | 1.39 |
| 1 or More Privacy Related Touchpoints in Past 12 Months | 12.88% | 32.70% | 2.54 |
| 1 or More Provider Touchpoints in Past 12 Months | 34.23% | 41.40% | 1.21 |
| 1 or More Family Member Touchpoints in Past 12 Months (Including Spouse) | 20.38% | 38.15% | 1.87 |
| 1 or More Family Member Touchpoints in Past 12 Months (Not Including Spouse) | 9.60% | 19.39% | 2.02 |
| 1 or More Billing Related Touchpoints in Past 12 Months | 30.00% | 63.11% | 2.10 |
| 1 or More Claims Related Touchpoints in Past 12 Months | 27.44% | 37.10% | 1.35 |
| 1 or More Plan Benefit Related Touchpoints in Past 12 Months | 54.66% | 72.00% | 1.32 |
| 1 or More Enrollment Related Touchpoints in Past 12 Months | 12.88% | 32.00% | 2.49 |

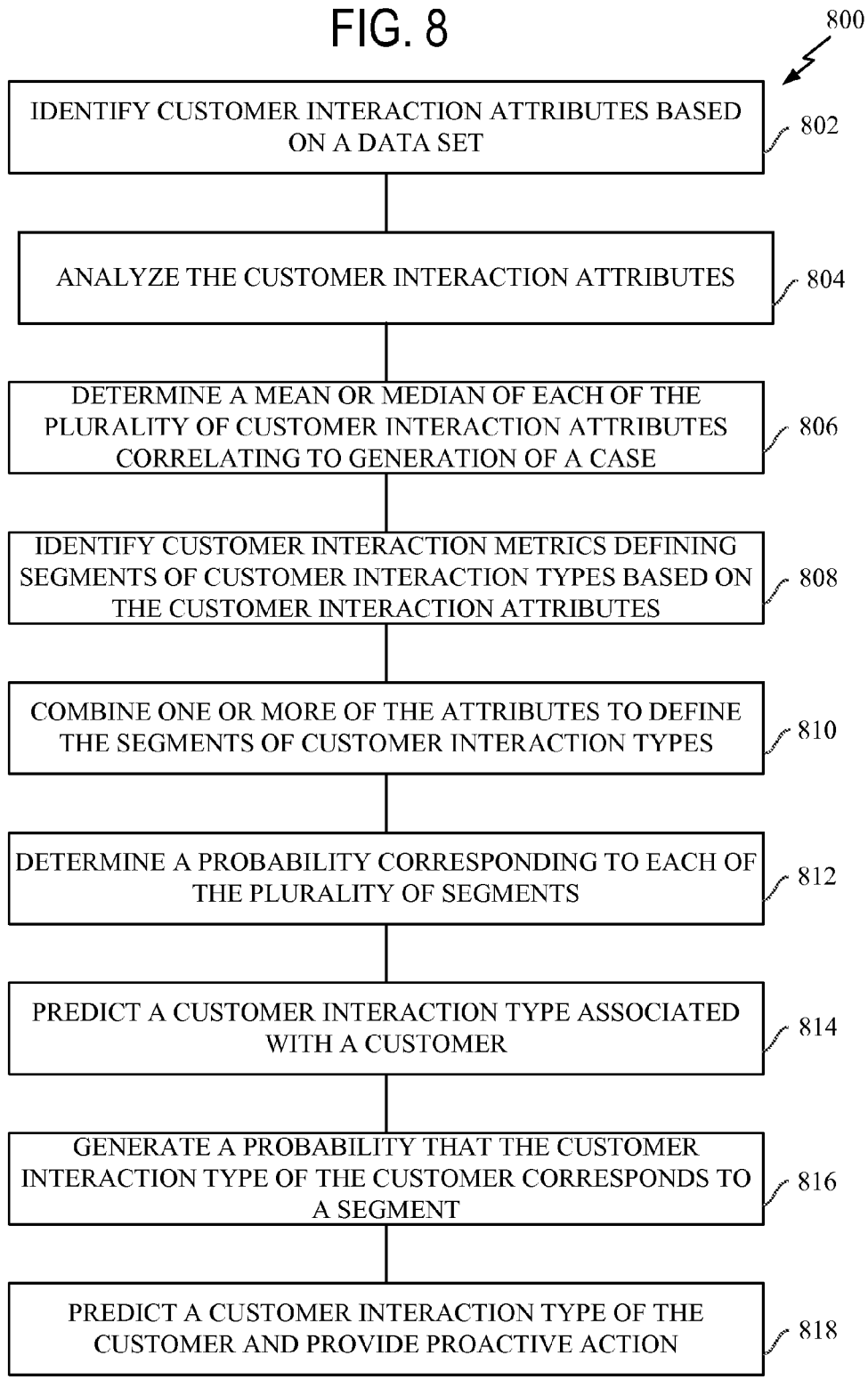

FIG. 10

| Cluster | Definition | Hhlds | Hhlds w/Cases | Lift | Cases / 1,000 |
|---|---|---|---|---|---|
| 1 | 1 inbound call in past year, 3+ privacy related touchpoints | 7,237 | 91 | 1.92 | 13 |
| 2 | 1 inbound call in past year, 1-2 privacy related touchpoints, 1+ transfers | 20,314 | 279 | 2.10 | 14 |
| 3 | 2-3 inbound calls in past year and 1+ privacy related touchpoints | 187,382 | 2,303 | 1.87 | 12 |
| 4 | 2-3 inbound calls in past year, no privacy related touchpoints, 1+ billing related touchpoints, 2+ transfers | 116,720 | 1,645 | 2.15 | 14 |
| 5 | 2-3 inbound calls in past year, no privacy or billing related touchpoints, 2+ enrollment related touchpoints | 39,305 | 558 | 2.17 | 14 |
| 6 | 4-5 inbound calls in past year, 7+ family member touchpoints (including spouse) | 6,248 | 156 | 3.81 | 25 |
| 7 | 4-5 inbound calls in past year, 2-6 family member touchpoints (including spouse) | 92,324 | 1,733 | 2.86 | 19 |
| 8 | 4-5 inbound calls in past year, less than 2 family member touchpoints (including spouse), 3+ transfers, 3+ billing related touchpoints | 33,099 | 1,195 | 5.51 | 36 |
| 9 | 4-5 inbound calls in past year, less than 2 family member touchpoints (including spouse), 2 transfers, 4+ billing related touchpoints | 19,051 | 426 | 3.41 | 22 |
| 10 | 6-11 inbound calls in past year, 1+ transfers, 6+ family member touchpoints (including spouse) | 9,849 | 410 | 6.35 | 42 |
| 11 | 6-11 inbound calls in past year, 6+ transfers, 4+ family member touchpoints (including spouse) | 3,966 | 251 | 9.65 | 63 |
| 12 | 6-11 inbound calls in past year, 6+ transfers, 1-3 family member touchpoints (including spouse) | 6,834 | 304 | 6.79 | 44 |
| 13 | 6-11 inbound calls in past year, 6+ transfers, no family member touchpoints (including spouse) | 17,381 | 807 | 7.08 | 46 |
| 14 | 12-17 inbound calls in past year, 4+ inbound calls in past 30 | 4,710 | 396 | 12.83 | 84 |
| 15 | 12-17 inbound calls in past year 1-3 inbound calls in past 30 days, 3+ transfers in past year | 13,240 | 748 | 8.62 | 56 |
| 16 | 12-17 inbound calls in past year, no inbound calls in past 30 days, 3+ transfers in past year | 8,543 | 435 | 7.77 | 51 |
| 17 | 18 or more calls in past year, 6+ calls in past 30 days | 1,427 | 201 | 21.49 | 141 |
| 18 | 18 or more calls in past year, less than 6 calls in past 30 days | 11,095 | 897 | 12.33 | 81 |

Clusters 1–5: Proactive (1002)
Clusters 6–9: (1004)
Clusters 10–18: Reactive (1006)

FIG. 11

| Segment | Key Themes | Households /year | Cases/year |
|---|---|---|---|
| 1 | | | |
| 2 | • Privacy, Billing or Enrollment related touchpoints<br>• Transfers<br>• 1-3 inbound calls in past year | 370K | 5.0K |
| 3 | | | |
| 4 | | | |
| 5 | | | |
| 6 | • Family member touchpoints<br>• Billing related touchpoints<br>• Transfers<br>• 4-5 inbound calls in past year | 150K | 3.5K |
| 7 | | | |
| 8 | | | |
| 9 | | | |
| 10 | • Calls within past 30 days<br>• Family member touchpoints<br>• Transfers<br>• 6-18+ inbound calls in past year | 75K | 4.5K |
| 11 | | | |
| 12 | | | |
| 13 | | | |
| 14 | | | |
| 15 | | | |
| 16 | | | |
| 17 | | | |
| 18 | | | |

Segments 1–5 (1002) and 6–9 (1004): Proactive
Segments 10–18 (1006): Reactive

| Variable | Relationship to Cases | Clusters |
|---|---|---|
| Number of Inbound Calls in Past 12 Months | ↑↑↑ | 1-18 |
| Number of Inbound Calls in Past 30 Days | ↑↑ | 14-18 |
| Number of Touchpoints Generated by a Family Member in Past 12 Months | ↑↑ | 6-13 |
| Number of Times Transferred in Past 12 Months | ↑↑ | 2, 4, 8-13, 15-16 |
| Number of Privacy Related Touchpoints in Past 12 Months | ↑ | 1-3 |
| Number of Billing Touchpoints in Past 12 Months | ↑ | 4, 8-9 |
| Number of Enrollment Related Touchpoints in Past 12 Months | ↑ | 5 |

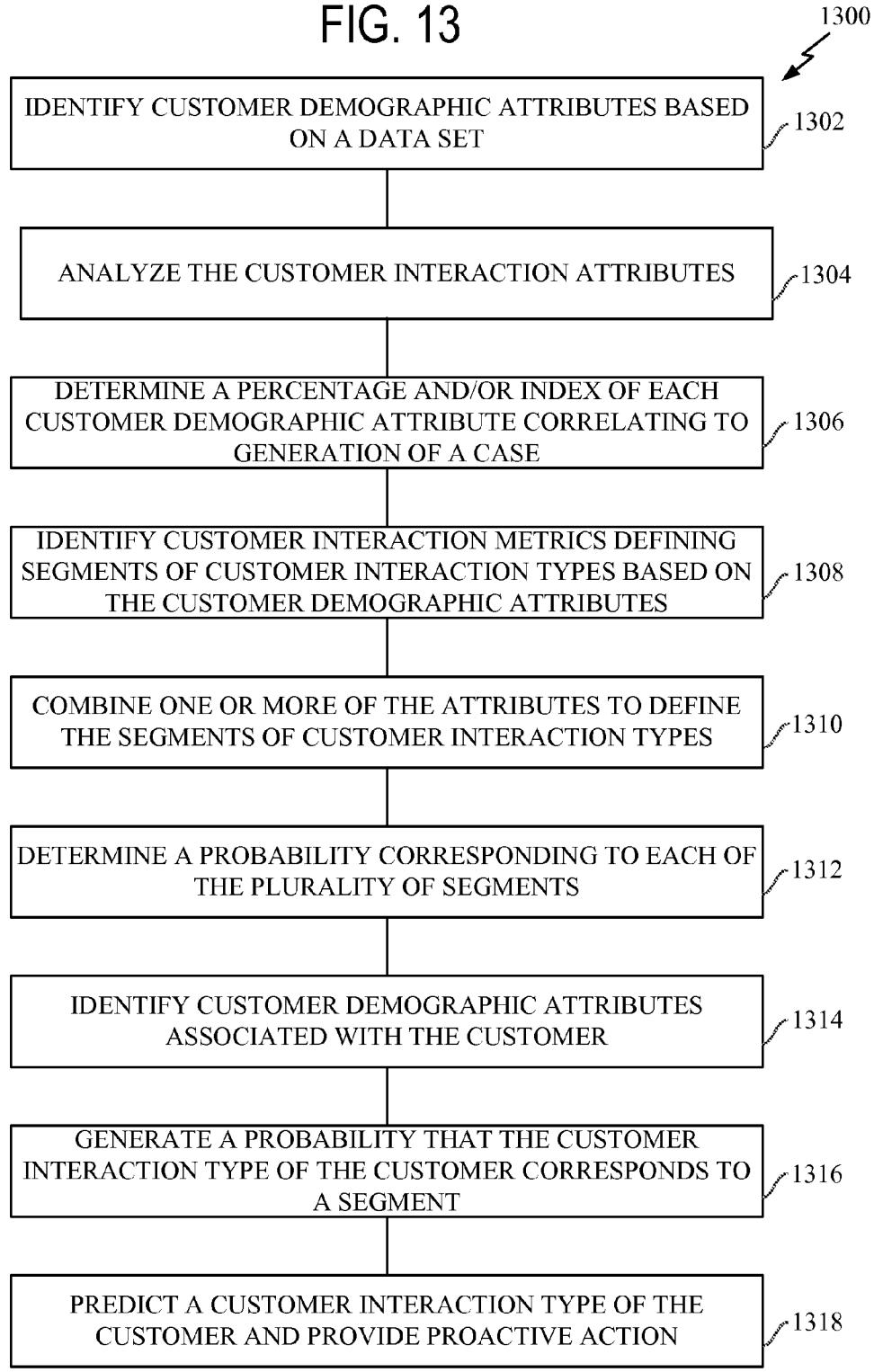

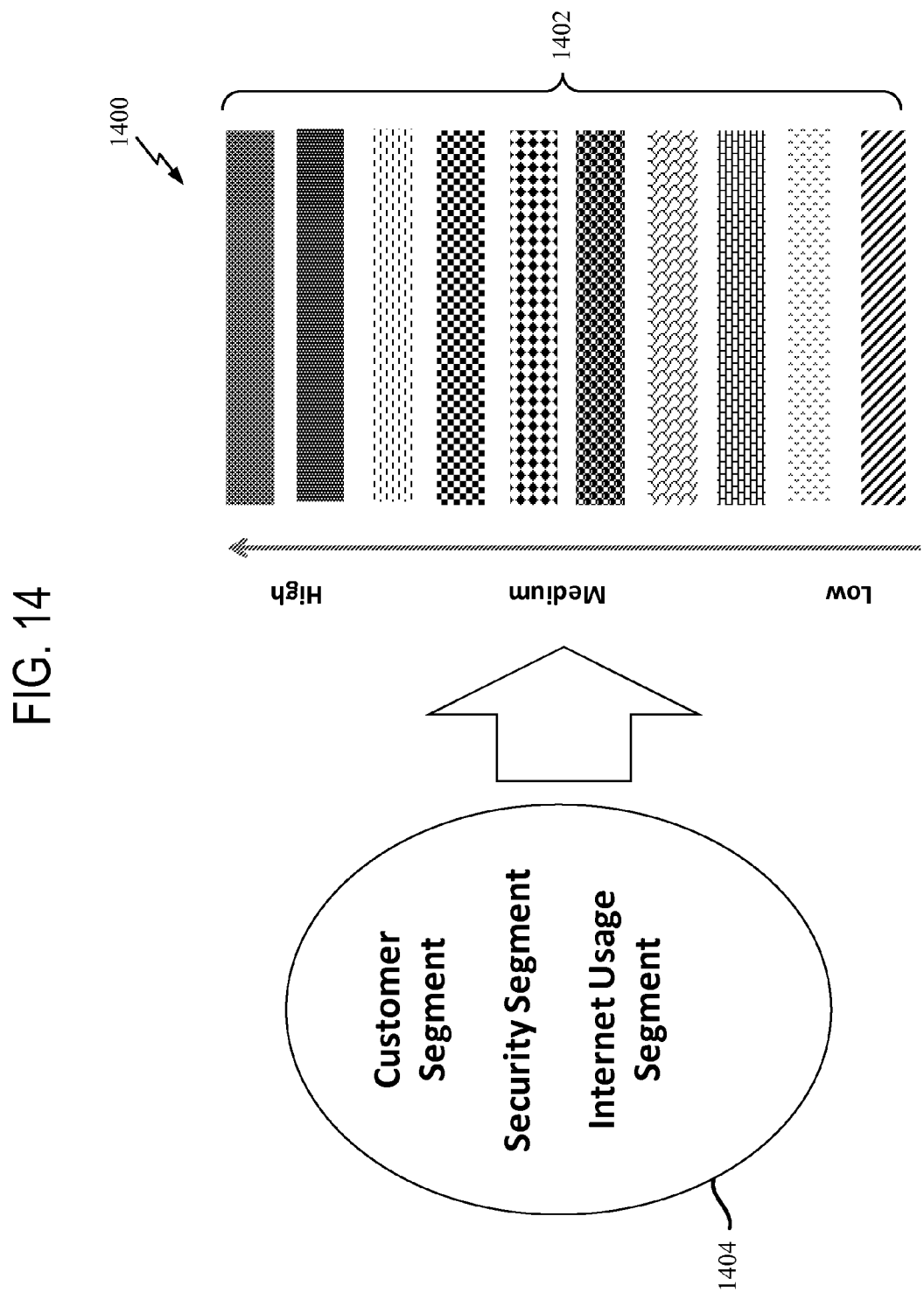

| Variable Description | Relationship to Cases | Profile | |
|---|---|---|---|

1502: Customer Segment: Segmentation model based on age, wealth, and number of kids:
1 = ↓Age; ↓Wealth; Kids
2 = ↓Age; ↑Wealth; Kids
3 = ↓Age; ↓Wealth
4 = ↓Age; ↑ Wealth
5 = ↓Age; ↑↑Wealth
6 = ↑Age; ↓Wealth
7 = ↑↑Age; ↑Wealth
8 = ↑↑Age; ↑Wealth Relationship to Cases: ↑ In general, as age and wealth increase, likelihood to generate a case increases

| Customer Segment | Index |
|---|---|
| 1 | 0.64 |
| 2 | 0.95 |
| 3 | 0.78 |
| 4 | 0.84 |
| 5 | 1.09 |
| 6 | 1.04 |
| 7 | 1.08 |
| 8 | 0.99 |

1504: Security Segment: Segmentation model based on level of interest or concern around information security.

Relationship to Cases: ↑ In general, as interest/concern around security increases, likelihood to generate a case increases Profile: Members in higher risk Customer Segments (5-7) are more concerned with security

| Median | Index |
|---|---|
| 13 | 1.23 |

1506: Internet Usage Segment: Segmentation model based on behaviors such as accessing the internet, visiting websites, or indicating a preference to be contacted via e-mail or web.

Relationship to Cases: ↓ In general, as likelihood to be a regular internet user decreases, likelihood to generate a case increases Profile: Cases cluster in the lower 40% of scores (13-20)

| Median | Index |
|---|---|
| 12 | 1.17 |

| Customer Segment | Non-Case | Case | Index |
|---|---|---|---|
| 1 | 2.35% | 1.49% | 0.64 |
| 2 | 3.78% | 3.61% | 0.95 |
| 3 | 6.30% | 4.90% | 0.78 |
| 4 | 5.43% | 4.56% | 0.84 |
| 5 | 2.28% | 2.49% | 1.09 |
| 6 | 18.19% | 18.95% | 1.04 |
| 7 | 32.88% | 35.41% | 1.08 |
| 8 | 28.79% | 28.58% | 0.99 |

FIG. 21

Case Segmentation Clusters — Proactive / Reactive (2100)

| # | | |
|---|---|---|
| 6 | 3,766 / 97 / 3.93 / 26 | 1,241 / 34 / 4.18 / 27 |
| 7 | 52,768 / 907 / 2.62 / 17 | 20,341 / 423 / 3.17 / 21 |
| 8 | 18,078 / 623 / 5.26 / 34 | 8,043 / 310 / 5.88 / 39 |
| 9 | 10,473 / 235 / 3.42 / 22 | 4,535 / 96 / 3.23 / 21 |
| 10 | 5,725 / 231 / 6.16 / 40 | 2,086 / 90 / 6.58 / 43 |
| 11 | 2,221 / 138 / 9.48 / 62 | 913 / 69 / 11.53 / 76 |
| 12 | 3,514 / 132 / 5.73 / 38 | 1,846 / 86 / 7.11 / 47 |
| 13 | 9,761 / 419 / 6.55 / 43 | 3,945 / 208 / 8.04 / 53 |
| 14 | 2,799 / 191 / 10.41 / 68 | 973 / 111 / 17.40 / 114 |
| 15 | 7,415 / 385 / 7.92 / 52 | 3,045 / 202 / 10.12 / 66 |
| 16 | 4,784 / 220 / 7.02 / 46 | 1,979 / 120 / 9.25 / 61 |
| 17 | 940 / 113 / 18.34 / 120 | 243 / 45 / 28.25 / 185 |
| 18 | 6,684 / 484 / 11.05 / 72 | 2,216 / 217 / 14.94 / 98 |

Legend: # Households / # Cases / Lift / Cases per 1,000

At Risk
High Risk

| Intervention | Selection Criteria | Households/year | Business Impact* | Financial Impact* |
|---|---|---|---|---|
| • Repeat Caller alert on Personalization Hub | • High score in case prioritization model or highest volume of cases per 1,000 (≥ 68)<br>• ~325K calls/year | ~65,000 | • Potential to eliminate 33K repeat calls<br>• Potential to prevent 300 cases/year<br>• Influence 1% of DOI complaints | • Net savings ~50K mins (~200K savings from repeat calls offset by 5 min incremental handle time for acting on alert) |

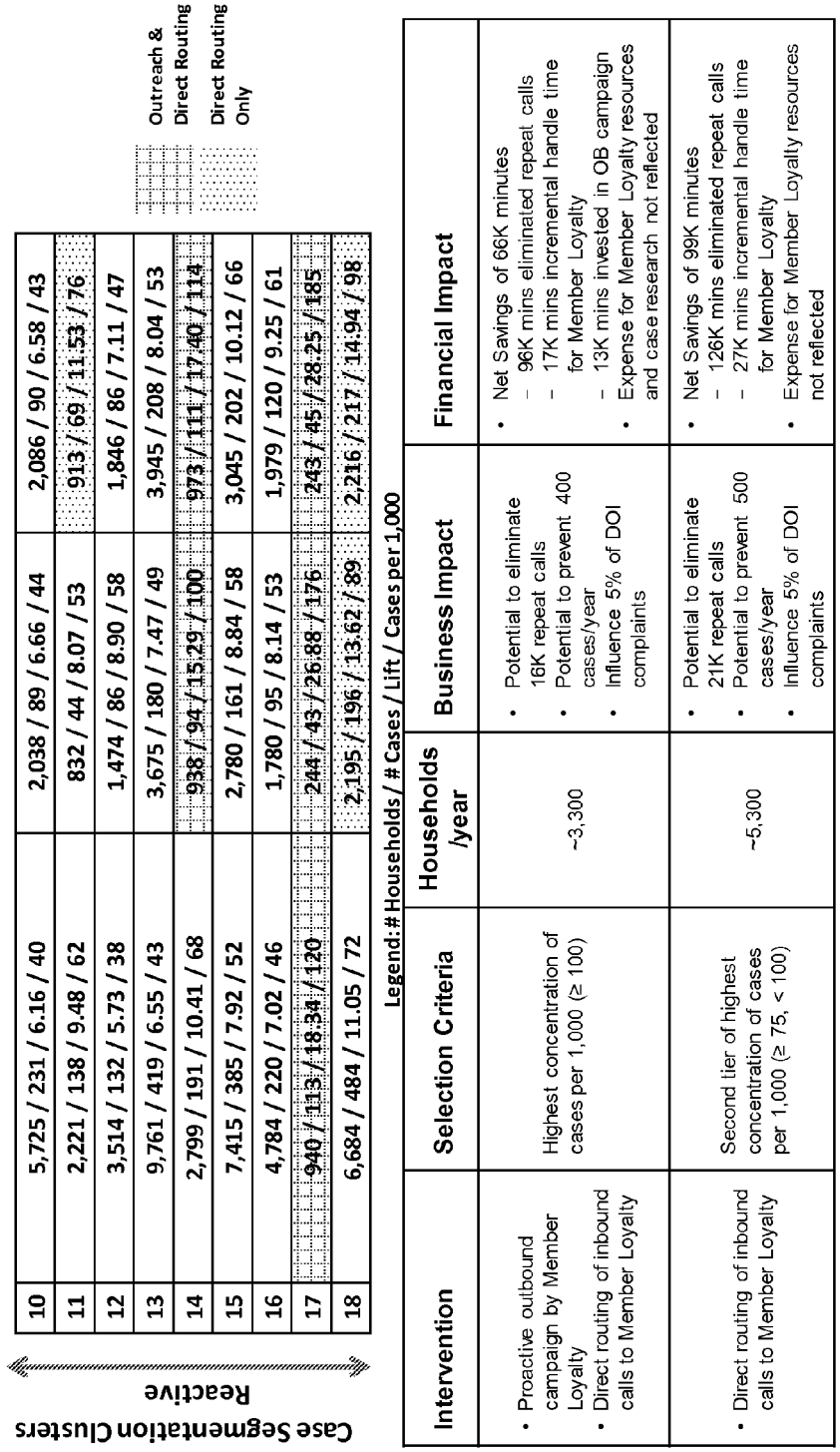

SYSTEMS AND METHODS FOR PREDICTING AND PROACTIVELY ADDRESSING CUSTOMER INTERACTIONS

FIELD OF TECHNOLOGY

The present disclosure is in the field of information technology and more particularly in the field of customer interactions.

BACKGROUND

Business and organizations commonly utilize communication centers such as call centers for the purpose of providing customer support, handling incoming information requests or inquiries, sale of products and policies, billing support, and other such operations. Communication centers may support interactions with customers over a number of different types of communication channels, including, telephone, e-mail, internet, etc.

Typically, communication centers have separate groups of employees for handling different types of requests. For example, there may be a sales group that handles sales, there may be a billing group that handles billing related issues, etc. Some customers may not know which group their particular inquiry fall into and may need to place multiple or repeat communication inquiries to address a need. This generates unnecessary costs and contributes to an unsatisfactory customer experience.

SUMMARY

Aspects of the present disclosure include systems and methods for proactively addressing or shaping customer interactions based on predicted customer needs. The systems and methods systematically and/or automatically predict the likelihood of particular customer interactions with an organization, such as an insurance provider. Appropriate predetermined actions are systematically and/or automatically implemented for a customer based on predicted likely interactions with the customer. This allows an organization to avoid unnecessary and/or repeat customer contacts and inquiries, which generate protracted work and the need for case management and escalations. In addition, the systems and methods improve first contact resolution metrics and customer experience, by predicting the need for intervention into a customer interaction without having to communicate with the customer.

In an embodiment, a customer interface method is disclosed. This method may include identifying a plurality of customer interaction types in a data set, wherein the data set includes customer interaction data and customer demographic data. A plurality of customer demographic types are identified in the data set, and the customer interaction types are correlated with the customer demographic types. The method may then include generating a probability that a future customer interaction matching one or more of the customer demographic types will match one or more of the customer interaction types.

This allows for the systematic and/or automatic prediction of a customer interaction type of a new or existing customer based at least in part on the customer demographic type and the probability. Thus, the customer may be directed based on the predicted customer interaction type, and/or an interaction may be proactively initiated with the customer based on the predicted likelihood of the type of customer interaction.

In another embodiment, customer interface method includes identifying a plurality of customer interaction attributes in a data set, the data set including customer interaction data and customer demographic data. Analyzing the plurality of customer interaction attributes, and identifying a plurality of customer interaction metrics defining a plurality of segments of customer interaction types based at least in part on the analyzed plurality of customer interaction attributes. The method may then include generating a probability that a new customer interaction of a new customer corresponds to one or more of the segments of customer interaction types.

In yet another embodiment, a customer interface method includes identifying a plurality of customer demographic attributes in a data set, the data set including customer interaction data and customer demographic data. Analyzing the plurality of customer demographic attributes, and identifying a plurality of customer interaction metrics defining a plurality of segments of customer interaction types based at least in part on the analyzed plurality of customer demographic attributes. The method may then include generating a probability that a new customer interaction of a new customer corresponds to one or more of the segments of customer interaction types.

While multiple embodiments are disclosed, including variations thereof, still other embodiments of the present application will become apparent to those skilled in the art from the following detailed description, which shows and describes illustrative embodiments of the application. The application is capable of modifications in various aspects, all without departing from its scope or spirit. The drawings and detailed description are illustrative in nature and not restrictive.

BRIEF DESCRIPTION OF THE FIGURES

Embodiments of devices, systems, and methods are illustrated in the figures of the accompanying drawings which are meant to be exemplary and not limiting, in which like references are intended to refer to like or corresponding parts, and in which:

FIGS. 5-7 illustrate tables corresponding to attributes according to embodiments of the present disclosure.

FIG. 8 illustrates a flow diagram of an overview of a method of analyzing data using a segmentation model according to embodiments of the present disclosure.

FIGS. 10 and 11 illustrate other overviews of the segmentation model according to embodiments of the present disclosure.

FIG. 12 illustrates a table corresponding to a relationship of attributes and the segmentation model according to embodiments of the present disclosure.

FIG. 13 illustrates a flow diagram of an overview of a method of analyzing data using a prioritization model according to embodiments of the present disclosure.

FIG. 14 illustrates a graphical overview of the prioritization model according to embodiments of the present disclosure.

FIGS. 15-17 illustrate other overviews of the prioritization model according to embodiments of the present disclosure.

FIGS. 21-23 illustrate tables demonstrating actionable results of the combination of the segmentation and the prioritization models according to embodiments of the present disclosure.

DETAILED DESCRIPTION

Businesses and organizations may have or employ call centers or communication centers for the purpose of providing customer support, handling incoming information requests or inquiries, sale of products and policies, billing support, and other such operations. In some circumstances, customers or members of such businesses and organizations (such as healthcare payers/insurance providers) have difficulty in making a claim or resolving issues. This can result in the customers placing multiple or repeat communication inquiries to a communication center in order to resolve an issue or address a need. For example, when members or prospective members are shopping for a product, an insurance policy, or servicing their existing account and/or policy they may have questions or inquiries. This generates unnecessary costs due to the need to manage cases/escalations, and can contribute to an unsatisfactory customer experience. An escalation occurs when a customer is transferred from one representative to another representative, from one business group to another, from an initial representative to a representative's manager, etc. in an attempt to have an issue resolved.

Accordingly, systems and methods for proactively responding to predicted customer needs are disclosed. The systems and methods predict the likelihood of particular customer interactions with an organization, such as an insurance provider. Appropriate predetermined actions are systematically and/or automatically implemented for a customer based on predicted likely interactions with the customer. This allows an organization to avoid unnecessary and/or repeat customer contacts and inquiries, which generate protracted work and the need for case management and escalations. In addition, the systems and methods improve first contact resolution metrics and customer experience, by predicting the needs of the customer and ways to address the customer needs before the customer contacts the organization and without having to communicate with the customer.

Figure 1:
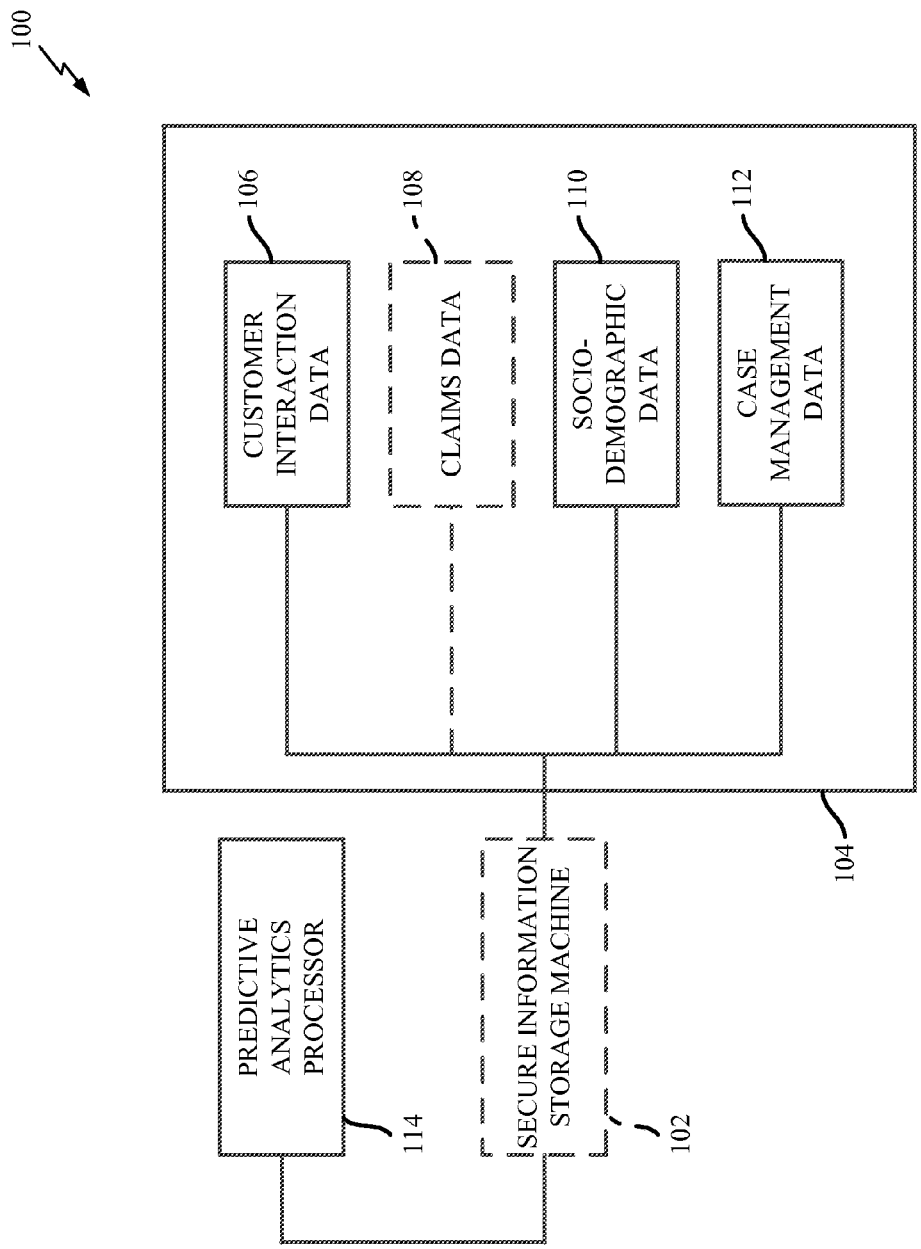
FIG. 1 illustrates a system overview according to embodiments of the present disclosure.

Referring to FIG. 1, a predictive information processing system 100 may include a secure information data storage machine 102 coupled to or in communication with one or more information data sources 104. However, in some embodiments, the secure information data storage machine 102 may not be required (for example, when the data is not confidential or otherwise in need of security). In these situations, the secure information data storage machine 102 may be replaced by an information data storage machine 102 or other database. The information data sources 104 may include one or more customer interaction data sources 106 such as communication center data (for example, a communication center for one or more insurance providers, healthcare providers, a health information exchange network, or other business or organization). Claims data sources 108 may optionally be included when the systems and methods are implemented in the context of the health services industry, and may include insurance providers. Socio-demographic data sources 110 and case management data sources 112 may also be included, for example. The secure information data storage machine 102 processes and stores the processed information from the information data sources 104.

The predictive information processing system 100 also includes a predictive analytics processor 114 coupled to the secure data storage machine 102. The predictive analytics processor 114 is configured to perform one or more steps of the methods described in further detail below. According to aspects of the disclosure, the predictive analytics processor 114 is configured to analyze the data in the secure data storage machine 102 and produce actionable proactive results (i.e., actions to be taken by predicting a likelihood of a customer interacting with an organization, such as an insurance provider); and improve first call resolution metrics and the organization's customer experience by predicting the needs of the customer and ways to address the customer needs before the customer contacts the organization and without having to communicate with the customer.

The presently disclosed systems and methods are configured to process and compute the data to produce various actionable proactive results (for example in the form of proactively directing customers to appropriate personnel, proactively communicating with customers, various forms of customer communication, such as, an in person interaction via a field agent, an email message, a text message, a message or interaction via social media, a telephone call, etc.) The processed data includes data formatted in a manner that can be quickly and securely accessed and interpreted by the predictive analytics processor 114 to efficiently generate a dynamic predictive view of potential actionable proactive results.

The presently disclosed systems and methods may be implemented in any type of communication center for any type of business or organization. In an example, the present disclosure may be implemented in a communication center relating to health services (such as insurance providers). A large amount of consumer healthcare information is routinely collected by healthcare providers, insurance providers, government agencies, researchers and other institutions. Electronic health records and electronic health information exchanges are commonly used to securely share electronically stored patient health information among healthcare providers and healthcare payers and consumers. Different healthcare industry stakeholders may operate and maintain their own secure health information storage systems and machines or may communicate with other healthcare industry stakeholders via health information exchanges to access patient health information and population health information.

According to aspects of the present disclosure, useful compilations of interaction data of consumers with insurance providers, consumer data, and healthcare data are created and stored in one or more integrated data warehouses. The data warehouse may compile data from various sources, process the compiled data, and store the processed data in a useful, secure and appropriately accessible form.

According to aspects of the present disclosure, the processed information may include consumer interaction data between insurance providers and consumers, various socio-demographic and care management data, claims data, clinical data for a large number of patients, and longitudinal healthcare claim data for a large number of healthcare consumers, for example.

Interaction data between insurance providers and consumers, claims data, socio-demographic data and case/escalation management data, clinical data, and prescription medication records, may also be integrated into the processed health information to provide both retrospective and prospective views of consumers and consumer populations. This enables insurance providers and healthcare stakeholders to identify potential risks and reduce costs, for example.

In this example, the processed data that may be accessed and interpreted by the predictive analytics processor 114, may include customer interaction data, such as, number of communications or inquiries, transfers, results of the inquiries, escalations related to the inquiries, privacy, billing, enrollment, etc. integrated with socio-demographic data, such as, age, wealth, children, level of concern around health information, cost of health care, prescription drug expenses, type of health insurance coverage and affordability, preferred method of communication (i.e., in person, internet, email, text message, telephone call, etc.).

According to another aspect of the present disclosure, the processed data includes integrated consumer data to inform patient outreach activities.

According to an aspect of the present disclosure, the predictive analytics processor 114 may be further configured to utilize clinical data. For example, including Extract/Transform/Load (ETL) technologies to parse, normalize, and integrate clinical/HL7 data (for example, including ADT's (Admission, Discharge, Transfer), Labs, Prescription/Pharmaceutical (Rx), and Text Reports) into a relational database. According to an aspect of the present disclosure, the predictive analytics processor 114 may also be configured to generate and/or utilize a proprietary, integrated clinical, claims, and consumer data model.

In some embodiments, the secure information storage machine 102 may include one or more data storage computers which may be located in a secure location or may be distributed over a number of secure locations. The secure information storage machine may also include means for protecting data privacy and security such as means for encryption and secure communication, for example.

Figure 2:
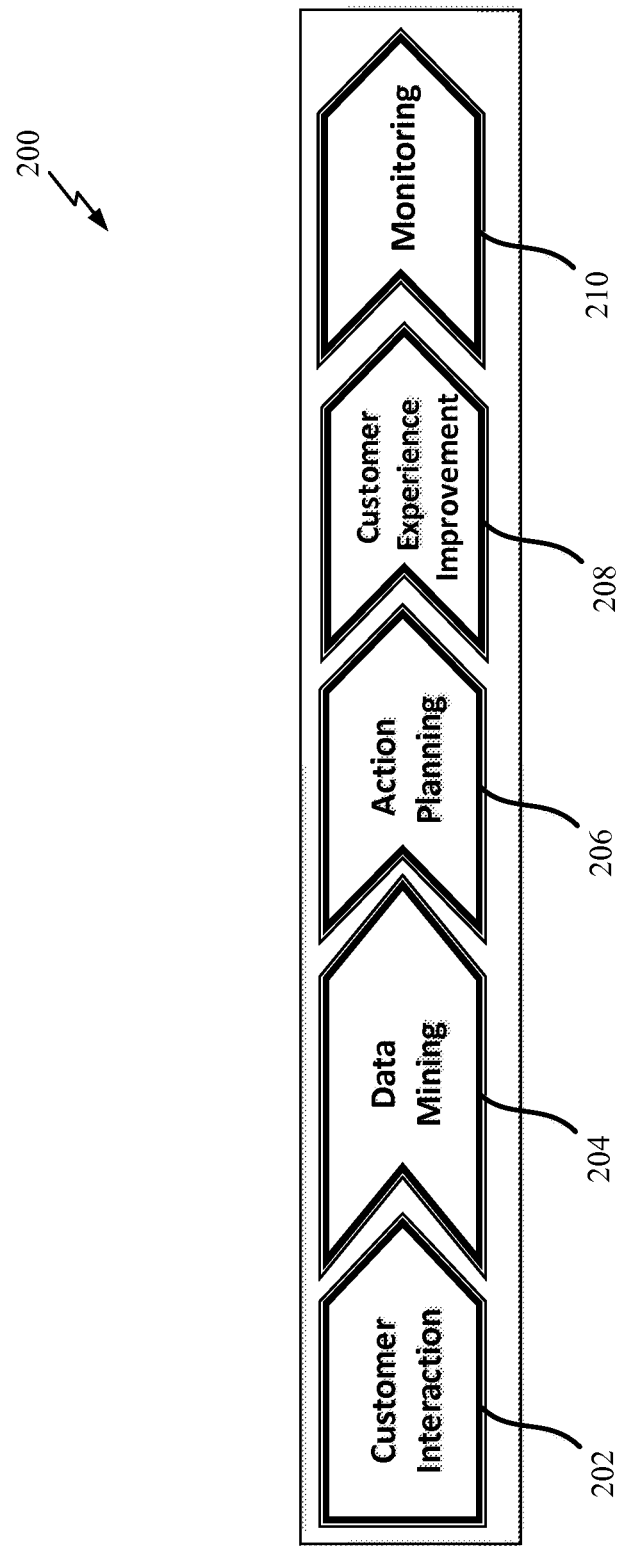
FIG. 2 illustrates a flow diagram of an overview of a method for systematically identifying situations and producing proactive, actionable results according to embodiments of the present disclosure.

Referring to FIG. 2, a flow diagram of an overview of a method 200 for systematically identifying situations, improving processes, and producing proactive, actionable results to address customer inquiries is illustrated. Customer interactions 202 are monitored, for example, when a customer places multiple inquiries to address a need. Data mining 204 is performed, for example using a modeling approach customized to yield a desired business outcome and systematically identify and rank customers for appropriate review and follow-up. The method 200 then performs an action planning function 206, in which complex customer cases and drivers are reviewed and action plans to address those customers' needs and improve processes are determined Based on the previous steps, customer experience improvement 208 is performed, for example, by improving customer interaction processes with customer outreach as appropriate to resolve issues and provide closed loop communication of the resolution. Customer experience monitoring 210 as improvements are implemented and cases resolved. This includes ongoing assessment of repeat interaction activity. Thus, the systems and methods monitor repeat interaction activity, proactively identify process improvement opportunities and complex customer situations, and improve the customer experience.

In an aspect, the systems and methods combine different model techniques. In an example, a decision tree modeling technique (also referred to herein as a segmentation modeling technique) is combined with a logistic regression modeling technique (also referred to herein as a prioritization modeling technique). In an example, these modeling techniques may be used in the context of a call center of an insurance provider to target customer interactions that were escalated to a high level within the insurance provider's organizations (also referred to as cases). In one aspect, the data mining mentioned above and described in further detail below uses an oversampling techniques to identify rare events and bring them into a state where they can be effectively modeled and actionable results determined.

Figure 3:
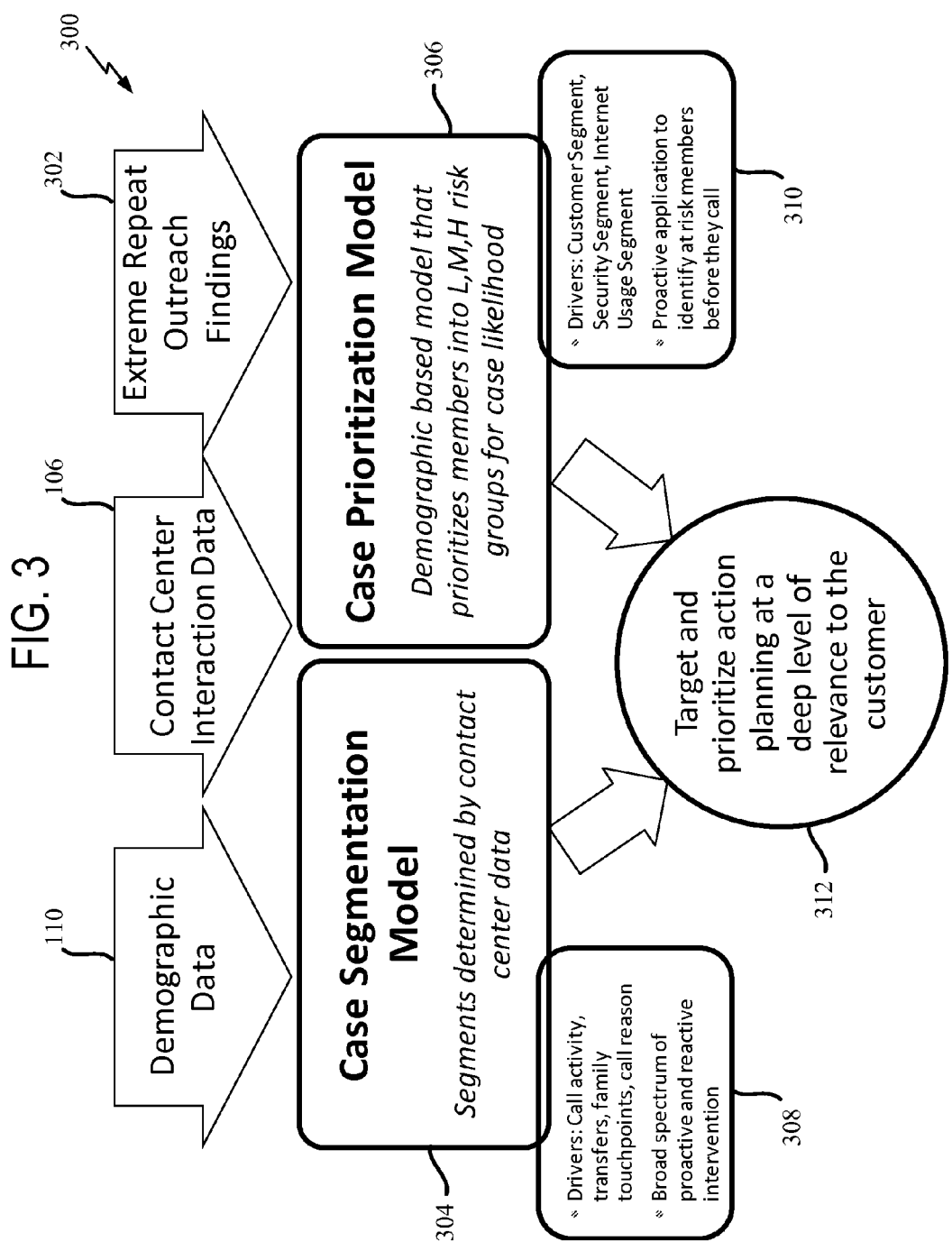
FIG. 3 illustrates a flow diagram of an overview of a method of a modeling technique according to embodiments of the present disclosure.

Referring to FIG. 3, a flow diagram of an overview of a method 300 for combining the different modeling techniques. As illustrated, the demographic data or socio-demographic data 110, the customer interaction data 106, and extreme repeat outreach findings 302 (for example, determined via analysis of the customer interaction data 106) are input into a case segmentation model 304 and a case prioritization model 306.

The case segmentation model 304 identifies key activity based attributes that define potential segments for targeted intervention or personalized treatment. The segments of the segmentation model 304 are determined based on the customer interaction data 106 (such as, call activity, transfers, family touchpoints (age, children, spouse, wealth, etc.), reason for the inquiry or call, etc.), as illustrated in block 308. A broad spectrum of proactive and reactive intervention is then determined based on the data, as illustrated in block 308.

The case prioritization model 306 may be a demographic based model that prioritizes customers into risk groups (such as, low, medium, and high risk) for likelihood is generating a case. The case prioritization model 306 is based on the demographic data or socio-demographic data 110 (such as, customer segment data, information security concern, preferred communication path, etc.), as illustrated in block 310. This is used to proactively identify at risk customers before such customers interact or place an inquiry to the insurance provider, as illustrated in block 310. The case segmentation model 304 and case prioritization model 306 are combined to target and prioritize action planning at a deep level of relevance to the customer, illustrated as block 312. The combination of the case segmentation model 304 and case prioritization model 306 allow for the ability to reduce the data set from numerous (for example, millions) customer interactions to an actionable amount (for example, less than about 1000 ).

Figure 4:
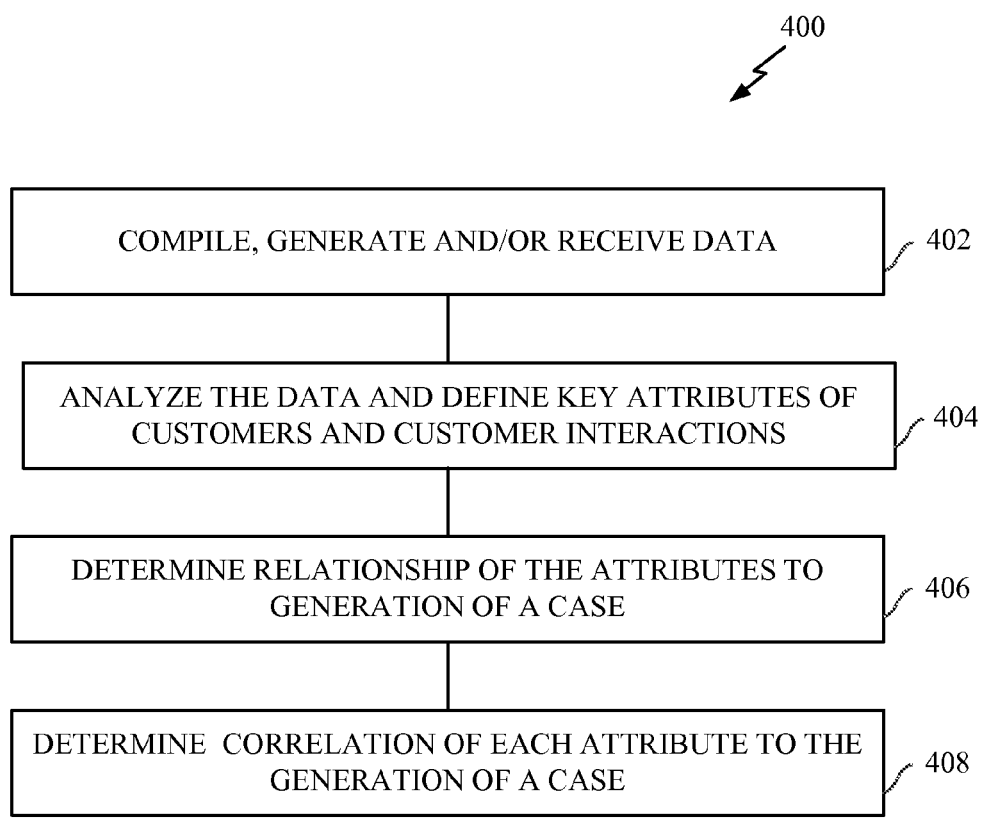
FIG. 4 illustrates a flow diagram of an overview of a method of analyzing data according to embodiments of the present disclosure.

In an embodiment, referring to FIG. 4, a method 400 of analyzing the data is described. The system compiles, generates and/or receives data, illustrated as block 402, such as the customer interaction data, socio-demographic data, claims data, etc. The system analyzes the data and defines key attributes of customers and interactions, illustrated as block 404. The system determines how the attributes relate to the generation of a case (such as an escalation), illustrated as block 406. The system may also determine a mean and/or median of the correlation of each attribute to the generation of a case, illustrated as block 408.

For example, FIGS. 5-7 illustrate tables 500, 600, and 700, respectively of customer interaction attributes 502, 602, and 702, respectively. These customer interaction attributes 502, 602, and 702 are analyzed, and a mean and/or median of the correlation of each customer interaction attribute 502, 602, and 702 to the generation of a case is determined. These customer interaction attributes 502, 602, and 702 are then used in one or more of the case segmentation and case prioritization models to improve processes, and produce proactive, actionable results to address customer inquiries.

In an embodiment, referring to FIG. 8, a method 800 of analyzing the data using the case segmentation model is described. The customer interaction attributes are identified from a data set, for example the customer interaction data and customer demographic data, illustrated as block 802. The customer interaction attributes are analyzed, illustrated as block 804. For example, a relationship of the customer interaction attributes to the generation of a case may be determined, and a correlation (for example, a mean and/or median of a correlation) of each attribute to the generation of a case may be determined, illustrated as block 806.

A plurality of customer interaction metrics defining a plurality of segments of customer interaction types are identified based at least in part on the analyzed plurality of customer interaction attributes, illustrated as block 808. For example, this may include combining one or more of the plurality of customer interaction attributes to define at least one of the plurality of segments of customer interaction types, illustrated as block 810. A probability corresponding to each of the plurality of segments of customer interaction types is then determined, wherein the probability relates to a likelihood a customer interaction associated with the segment will result in generation of a case, illustrated as block 812. The plurality of segments of customer interaction types and probabilities are described and illustrated in further detail with respect to FIGS. 9-12 below.

The systems and method may then identify one or more of the plurality of customer interaction attributes associated with the customer (which may be a new or future customer), illustrated as block 814, and generate a probability that a customer interaction of the customer corresponds to one or more of the segments of customer interaction types, illustrated as block 816. This allows the systems and methods to predict a customer interaction type of the customer based at least in part on the segments of customer interaction types, and proactively provide one or more actions to be taken with respect to the customer, illustrated as block 818. These actions may include, for example, proactively altering a way in which a customer interaction is handled (such as by proactively routing a customer to certain personnel), initiating an interaction with the customer based on the probability (such as, an in person interaction via a field agent, an email message, a text message, a message or interaction via social media, a telephone call, etc.), and/or directing the customer to a predetermined specialized business unit based on the probability, etc.

Figure 9:
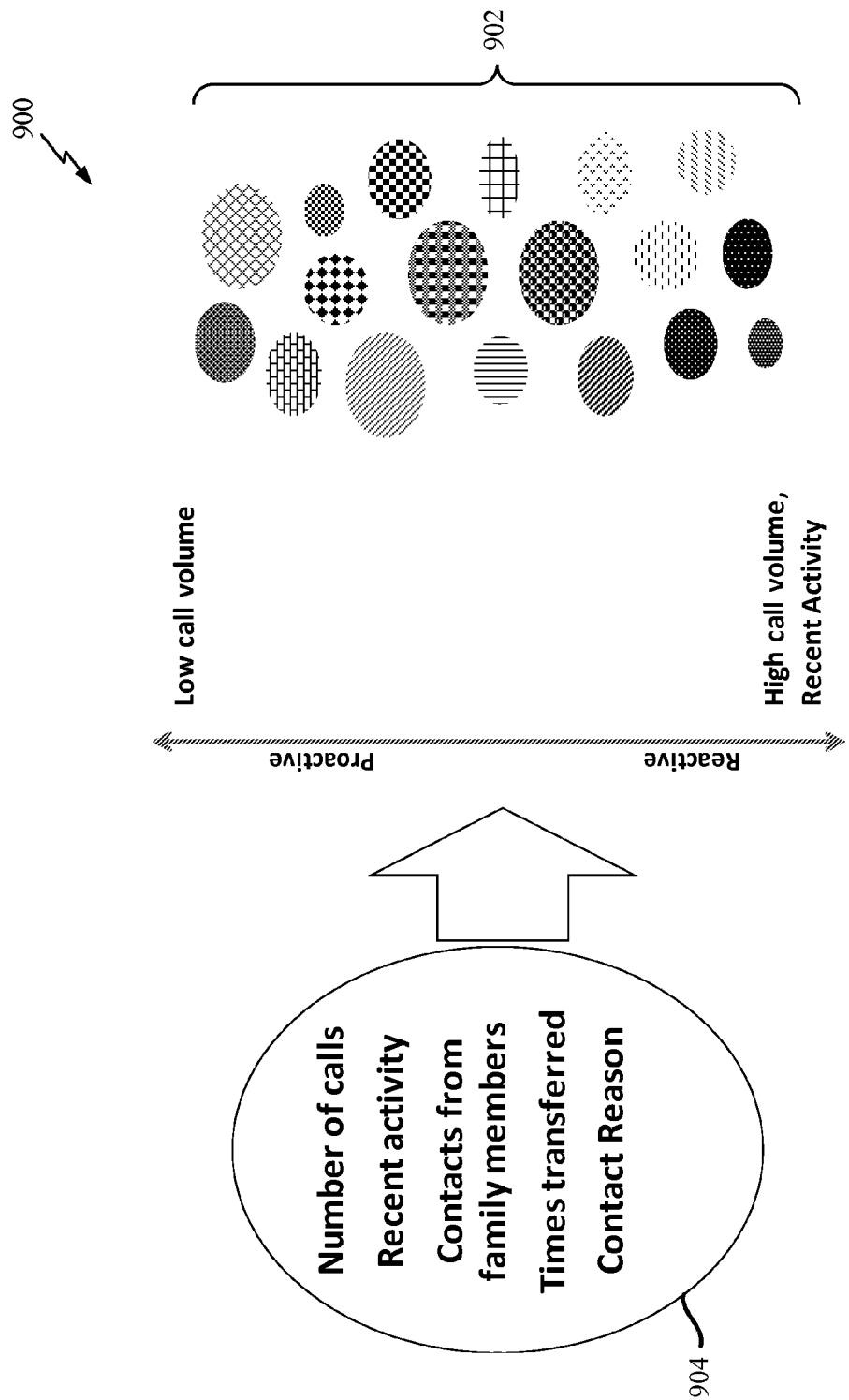
FIG. 9 illustrates a graphical overview of the segmentation model according to embodiments of the present disclosure.

As mentioned above, the case segmentation model identifies key activity based metrics that define potential segments for targeted personalized treatment. Referring to FIG. 9, in an example, a categorization 900 of 18 segments represented by the various circular shapes 902 are organized according to call volume and organized along a scale ranging from reactive to proactive. The 18 segments are based on the customer interaction attributes, such as those identified in FIGS. 5-7. In general, the attributes include number of calls, recent activity, number of transfers, family touchpoints (age, children, spouse, wealth, etc.), reason for the inquiry or call, etc., illustrated as 904.

In a specific example, the 18 segments may be defined as shown in the table 1000 illustrated in FIG. 10. As illustrated, the 18 segments can be thought of as 3 groups: a first group 1002, a second group 1004, and a third group 1006. As described above, a probability or lift is determined corresponding to each of the plurality of segments is determined, wherein the probability relates to a likelihood a customer interaction associated with the segment will result in generation of a case.

Referring to FIG. 11, an example table 1100 summarizing the case segmentation model is illustrated and described. As illustrated, the first group 1002 corresponds to segments 1-5 and relates to customers that have privacy, billing, or enrollment related touchpoints, included transfers, and 1-3 in bound calls within the past year. In an example, this first group 1002 falls on the proactive side of the scale, and includes about 370 thousand households per year and about 5 thousand cases per year. The second group 1004 corresponds to segments 6-9 and relates to customers that have family member touchpoints, billing related touchpoints, included transfers, and 4-5 in bound calls within the past year. In an example, this second group 1004 falls in the proactive side of the scale closer to the reactive side than the first group, and includes about 150 thousand households per year and about 3.5 thousand cases per year. The third group 1006 corresponds to segments 10-18 and relates to customers that have called within the past 30 days, have family member related touchpoints, included transfers, and 6-18 plus in bound calls within the past year. In an example, this third group 1006 falls on the reactive side of the scale, and includes about 75 thousand households per year and about 4.5 thousand cases per year.

In general, certain relationships between the segments and the customer attributes relate to an increasing probability of generation of a case. For example, as illustrated in table 1200 of FIG. 12, key attributes 1202 are organized according to their respective strength of the attribute's relationship to cases and contribution to differentiating cases from non-case households of generation of a case. For example, the number of inbound calls in past 12 months attribute has the highest strength, which is incorporated into segments 1-18. The remaining attributes follow in descending strength as follows:

The number of inbound calls in past 30 days attribute increases, which is incorporated into segments 14-18; the number of touchpoints generated by a family member in past 12 months attribute increases, which is incorporated into segments 6-13; the number of times transferred in past 12 months attribute increases, which is incorporated into segments 2, 4, 8-13, and 15-16; the number of privacy related touchpoints in past 12 months attribute increases, which is incorporated into segments 1-3; the number of billing touchpoints in past 12 months attribute increases, which is incorporated into segments 4 and 8-9; and number of enrollment related touchpoints in past 12 months attribute increases, which is incorporated into segment 5.

In an embodiment, referring to FIG. 13, a method 1300 of analyzing the data using the case prioritization model is described. The customer socio-demographic or demographic attributes are identified from a data set, for example the customer interaction data and customer demographic data, illustrated as block 1302. The customer demographic attributes are analyzed, illustrated as block 1304. For example, a relationship of the customer demographic attributes to the generation of a case may be determined, and a percentage and/or index associated with of each of the plurality of customer demographic attributes resulting in the generation of a case may be determined, illustrated as block 1306.

A plurality of customer interaction metrics defining a plurality of segments of customer interaction types are identified based at least in part on the analyzed plurality of customer demographic attributes, illustrated as block 1308. For example, this may include combining one or more of the plurality of customer demographic attributes to define at least one of the plurality of segments, illustrated as block 1310. A probability corresponding to each of the plurality of segments of customer interaction types is then determined, wherein the probability relates to a likelihood a customer interaction associated with the segment will result in generation of a case, illustrated as block 1312. The plurality of segments and probabilities are described and illustrated in further detail with respect to FIGS. 14-17 below.

The systems and method may then identify one or more of the plurality of customer demographic attributes associated with the customer (which may be a new or future customer), illustrated as block 1314, and generate a probability that a customer interaction of the customer corresponds to one or more of the segments of customer interaction types, illustrated as block 1316. This allows the systems and methods to predict a customer interaction type of the customer based at least in part on the segments of customer interaction types, and proactively provide one or more actions to be taken with respect to the customer, illustrated as block 1318. These actions may include, for example, proactively initiating an interaction with the customer based on the probability (such as, an in person interaction via a field agent, an email message, a text message, a message or interaction via social media, a telephone call, etc.), and/or directing the customer to a predetermined business unit based on the probability, etc.

As mentioned above, the case prioritization model may be a demographic based model that prioritizes customers into risk groups (such as, low, medium, and high risk) for likelihood is generating a case. Referring to FIG. 14, in an example, a categorization 1400 of segments represented by the various rectangular shapes 1402 are ranked according to probability of generating a case and organized along a scale ranging from low to high. The segments are based on number of metrics, including customer segment data, information security concern, preferred communication path, etc., illustrated as 1404.

The case prioritization model may be based primarily on socio-demographics or demographics. This allows the systems and methods to predict potential case generation for new and future customers for which there is no historical data. The model also provides some actionability relative to how the model aligns with business objectives.

Referring to FIG. 15, in an example, a table 1500 summarizing the case prioritization model is illustrated. As illustrated, the segments can be thought of as 3 groups. A first group 1502 corresponding to customer segments in which a household level segmentation model is based primarily on age, wealth and presence of children, etc. This household level segmentation can be thought of as including 8 segments: 1) People younger in age having a low wealth, and kids; 2) People younger in age having a moderate to high wealth, and kids; 3) People younger in age having a low wealth, and no kids; 4) People younger in age having a moderate wealth, and no kids; 5) People younger in age having a high wealth, and no kids; 6) People older in age having a low wealth; 7) People older in age (for example, 66-75) having a moderate to high wealth; and 8) People older in age (for example, 76+) having a moderate to high wealth.

Figure 16:
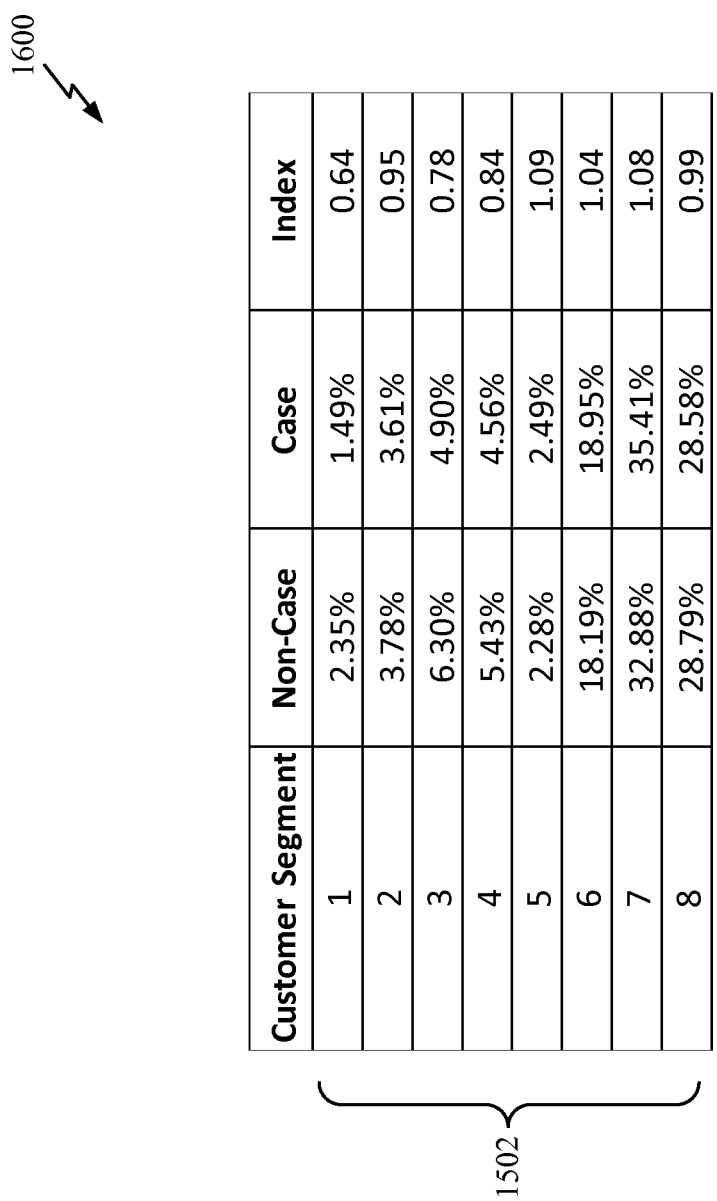

Referring to tables 1500 and 1600 illustrated in FIGS. 15 and 16, respectively, in general, as age and wealth increase (with some pockets of lower wealth), the probability to generate a case increases. In the example illustrated in FIGS. 15 and 16, the percentage of non-cases and cases, as well as indices of the 8 customer segments are determined. The indices are as follows: 1) 0.64, 2) 0.95, 3) 0.78, 4) 0.84, 5) 1.09, 6) 1.04, 7) 1.08, and 8) 0.99.

Referring back to FIG. 15, a second group 1504 corresponds to an information security segment (i.e., the 9th segment) including a model ranking level of interest or concern around information security. This model may consider factors, such as, paying for health care expenses, prescription drug affordability and having adequate health insurance coverage, etc. Scores based on this model range from 1-20 with 1 having the highest level of concern or interest.

In general, as interest/concern around information security increases, probability to generate a case increases. In the example illustrated in FIG. 15, customers in higher risk customer segments 5-7 are more concerned with information security, resulting in a median of 13 and an index of 1.23.

A third group 1506 corresponds to an internet usage segment (i.e., the 10th segment) including a model ranking households likelihood to be regular internet users. This model is based on behaviors, such as, accessing the internet, visiting insurance provider websites, indicating a preference to hear from the insurance provider via e-mail or the internet, etc. Scores based on this model range from 1-20 with 1 having the highest level of internet usage.

In general, as likelihood to be a regular internet user decreases, probability to generate a case increases. In the example illustrated in FIG. 15, cases tend to cluster in the lower 40% of scores (13-20), resulting in a median of 12 and an index of 1.17.

Figure 17:
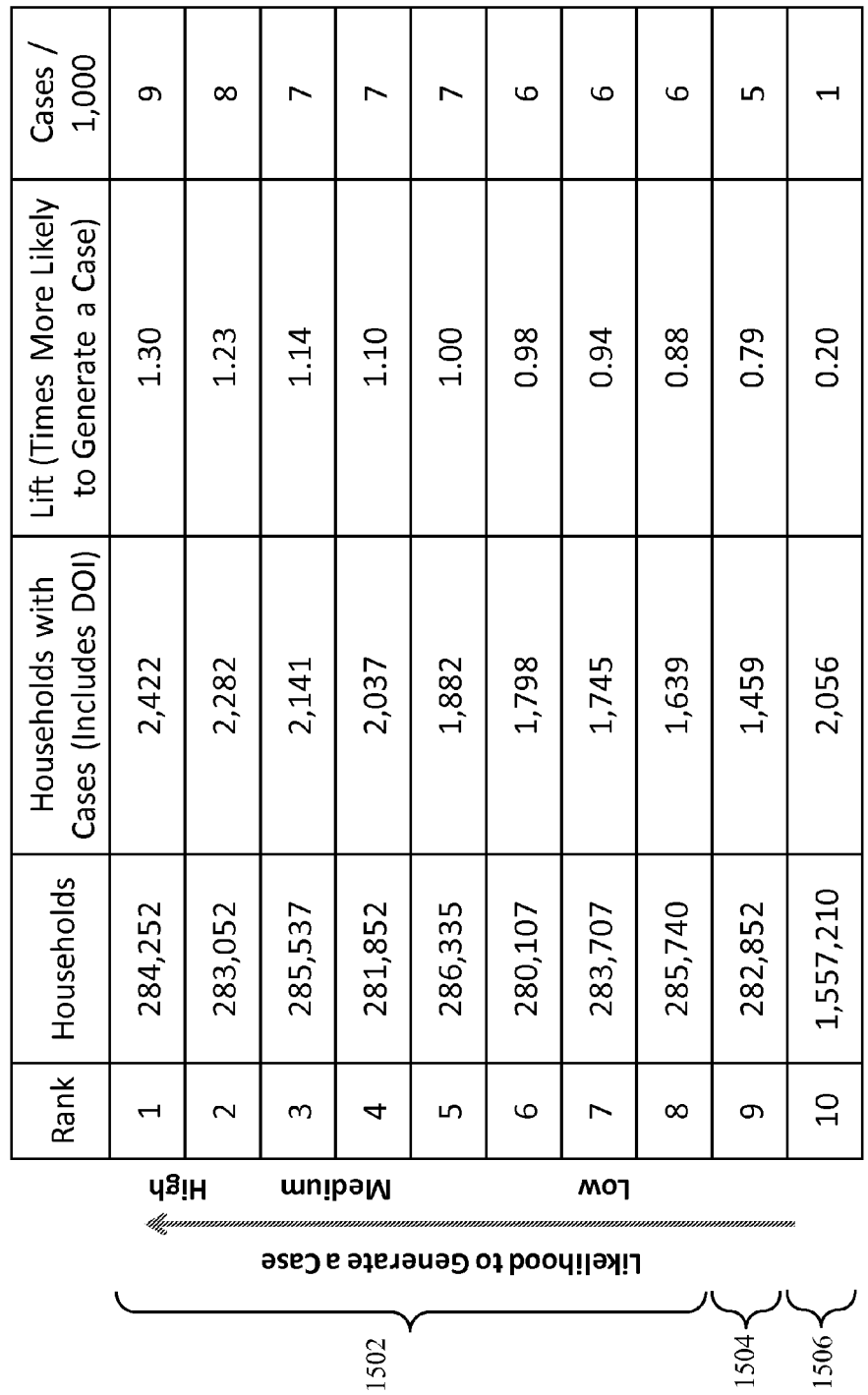

As described above and illustrated in table 1700 illustrated in FIG. 17, a probability or lift is determined corresponding to each of the segments (1-8, illustrated as 1502; 9, illustrated as 1504; and 10, illustrated s 1506) is determined, wherein the probability relates to a likelihood a customer interaction associated with the segment will result in generation of a case. As illustrated, the probability or lift decreases from 1.30 (corresponding to segment 1) to 0.20 (corresponding to segment 10).

Figure 18:
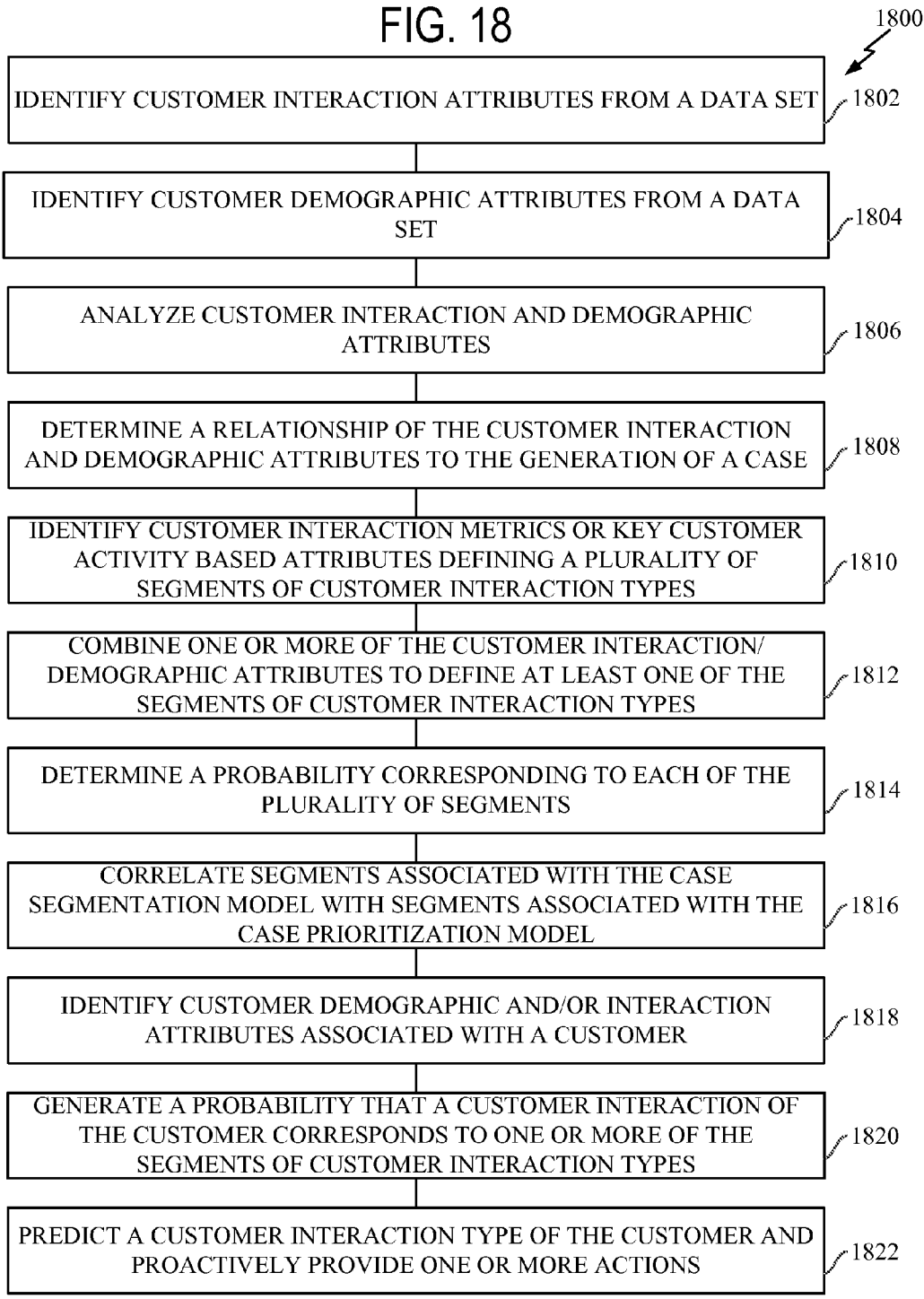
FIG. 18 illustrates a flow diagram of an overview of a method according to embodiments of the present disclosure.

In an aspect, both of the case segmentation and case prioritization models may be combined. This allows for the ability to target and prioritize customers for action planning and personalized treatment. In an embodiment, referring to FIG. 18, a method 1800 of analyzing the data using the case segmentation and prioritization model is described. In block 1802, the customer interaction attributes are identified from a data set, for example the customer interaction data and customer demographic data. The customer demographic attributes are also identified from a data set, illustrated as block 1804. The customer interaction and demographic attributes are analyzed, illustrated as block 1806. For example, a relationship of the customer interaction and demographic attributes to the generation of a case may be determined, as described above, illustrated as block 1808.

A plurality of customer interaction metrics or key customer activity based attributes defining a plurality of segments of customer interaction types (i.e., the segments of the case segmentation model and the case prioritization model described above) are identified based at least in part on the analyzed customer interaction and demographic attributes, illustrated as block 1810. For example, this may include combining one or more of the customer interaction/demographic attributes to define at least one of the segments of customer interaction types, illustrated as block 1812. A probability corresponding to each of the plurality of segments is then determined, wherein the probability relates to a likelihood a customer interaction associated with the segments will result in generation of a case, illustrated as block 1814.

The segments associated with the case segmentation model and the segments associated with the case prioritization model may then be correlated with each other, illustrated as block 1816. This may include generating a matrix of the two models on top of each other. For example, the results of the case segmentation model may be thought of as coordinates along a Y axis and the results of the case prioritization model may be thought of as coordinates along a X axis. This allows the results to be correlated and provided in a graphical form. The systems and method may then identify one or more of the plurality of customer demographic and/or interaction attributes associated with a customer (which may be a new or future customer), illustrated as block 1818, and generate a probability that a customer interaction of the customer corresponds to one or more of the segments of customer interaction types, illustrated as block 1820. For example, a probability that a future customer interaction matches one or more of the customer demographic segments or case prioritization segments will match one or more of the customer interaction types or case segmentation segments may be generated. This allows the systems and methods to predict a customer interaction type of the customer based at least in part on the segments of customer interaction types and/or customer demographic types and probability; and proactively provide one or more actions to be taken with respect to the customer, illustrated as block 1822. These actions may include, for example, proactively initiating an interaction with the customer based on the probability (such as, an in person interaction via a field agent, an email message, a text message, a message or interaction via social media, a telephone call, etc.), and/or directing the customer to a predetermined business unit based on the probability and/or predicted interaction type, etc.

For example, the systems and methods may match a new customer demographic type of a new customer with one or more of the customer demographic types, and predict a customer interaction type of the new customer based at least in part on the new customer demographic type and the probability. The systems and methods may identify one or more customers who are associated with the customer interaction type of the new customer, identify customer interaction data in the data set corresponding to the one or more identified customers; and predict the interaction type of the customer interaction type of the new customer based at least in part on the identified customer interaction data. The systems and methods may automatically identify one or more of the key customer activity based attributes associated with the new customer, and predict the customer interaction type of the new customer based at least in part on the key customer activity based attributes.

They systems and methods may also be used in association with current customers. For example, the systems and methods may automatically identify one or more customers based at least in part on the key customer activity based attributes associated with the identified or current customers, and predict a likelihood of a future customer interaction associated with the identified or current customers based at least in part on the key customer activity based attributes. The systems and methods may then proactively initiate an interaction with the customer based on the probability (such as, an in person interaction via a field agent, an email message, a text message, a message or interaction via social media, a telephone call, etc.), and/or direct the customer to a predetermined business unit based on the probability and/or predicted interaction type, etc.

Figure 19:
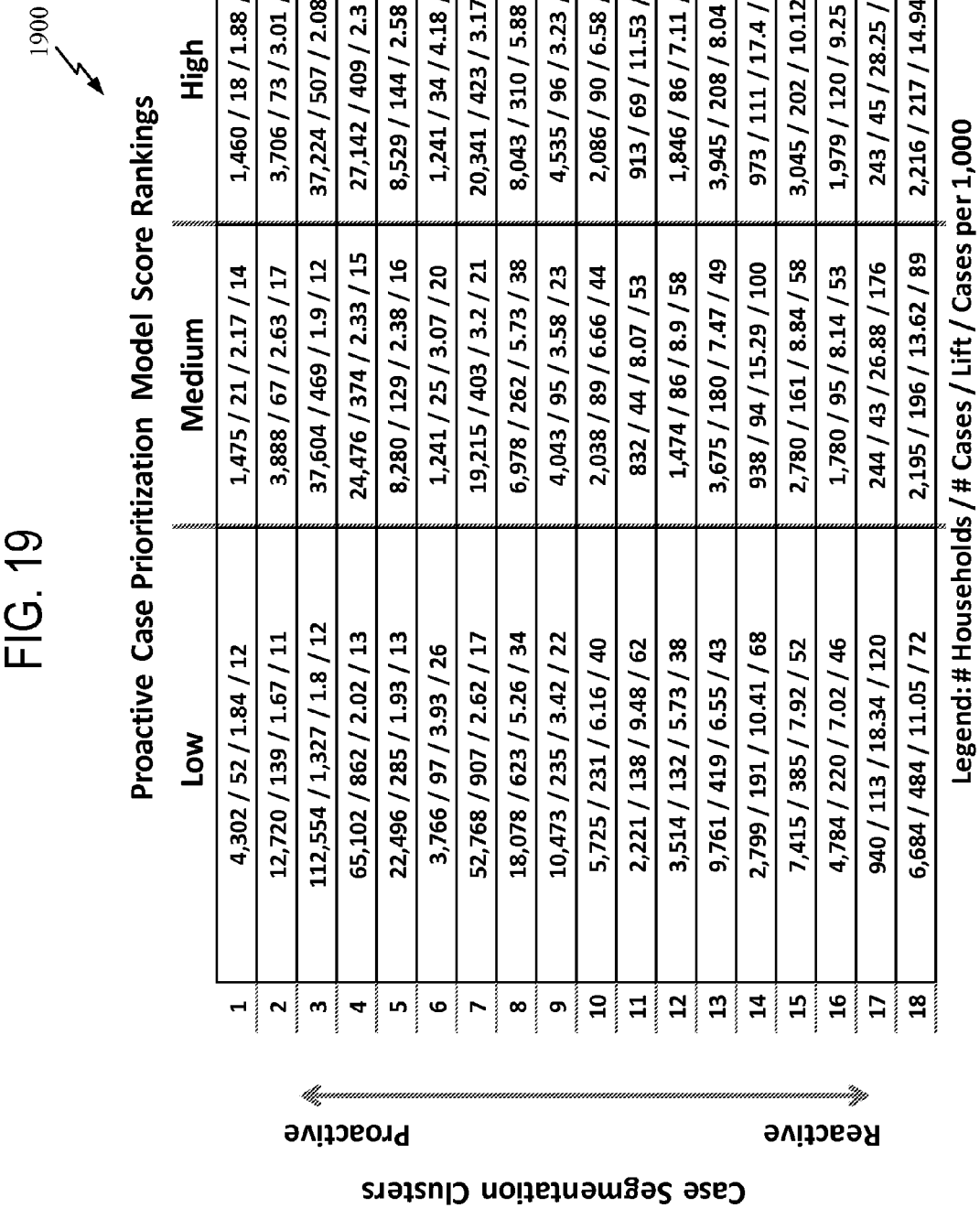
FIG. 19 illustrates an overview of a combination of the segmentation and the prioritization models according to embodiments of the present disclosure.

An example, of using the case segmentation model and case prioritization model in the context of a call center for an insurance provider is described with reference to FIGS. 19-23. Referring to FIG. 19, a matrix 1900 is illustrated, based on the example data set, described above and illustrated in FIGS. 5-7, 10, and 15-17. As illustrated in FIG. 19, the results of the case segmentation model are organized along a Y axis and the results of the case prioritization model are organized along a X axis.

Figure 20:
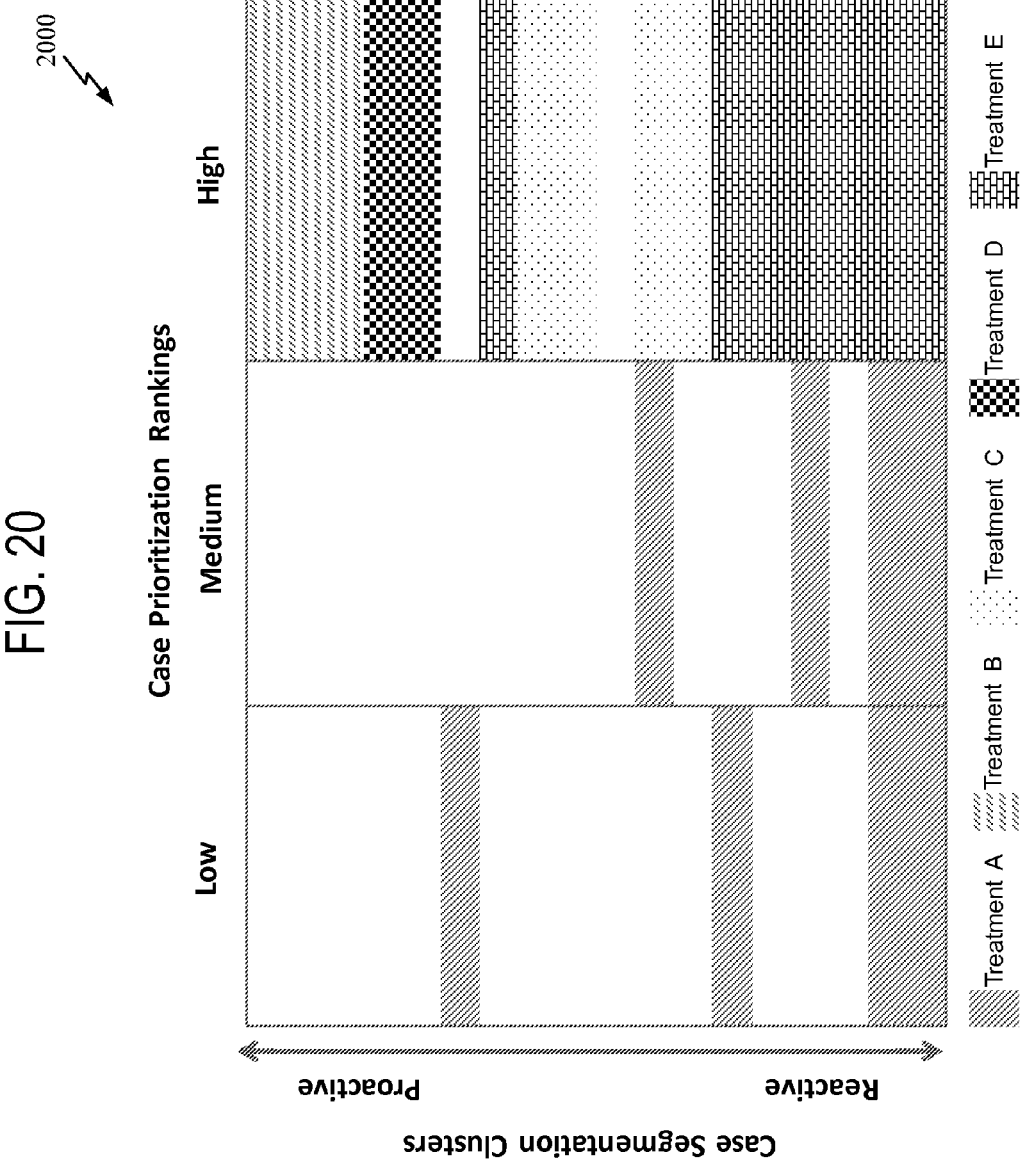
FIG. 20 illustrates an graphical overview of a combination of the segmentation and the prioritization models according to embodiments of the present disclosure.

Referring to FIG. 20, the results of the case segmentation model may also be organized along a Y axis and the results of the case prioritization model may be organized along a X axis, and presented in graphical form in graph 2000. The graph 2000 may also color code or otherwise designate certain overlapping regions or portions of the case segmentation model and case prioritization model indicating one or more different intervention, treatment, or proactive actions. This designation may be based on the degree of risk, as well as the features or attributes to provide proactive personalized interactions with customers.

Referring to FIG. 21, a first option is to engage more deeply with customers at an elevated risk for generating a case. A table 2100 illustrated in FIG. 21 demonstrates that segments 6-13 of the case segmentation model have portions that correspond with a high ranking of the case prioritization model. These portions are identified as at risk. Similarly, segments 15 and 16 of the case segmentation model have portions that correspond with a high ranking of the case prioritization model. These portions are identified as high risk. Segments 14, 17, and 18 of the case segmentation model are identified as high risk, along the entire low to high ranking of the case prioritization model. These at risk and/or high risk situations may be predicted and proactive actions relating to engaging more deeply with customers in these situations may be provided.

Referring to FIG. 22, a second option is to provide an outbound campaign coupled with priority routing of customers directly to a Member Loyalty department or customer relations department of the insurance provider, for example, for households/customers with a high probability of generating a case. A table 2200 illustrated in FIG. 22, demonstrates that segment 11 of the case segmentation model has a portion that corresponds with a high ranking of the case prioritization model. Similarly, segment 18 of the case segmentation model has two portions that correspond with a medium and high ranking, respectively, of the case prioritization model. These portions may be identified with the option to proactively direct customers falling in these portions directly to a Member Loyalty department or customer relations department of the insurance provider.

Segment 14 of the case segmentation model has two portion that corresponds with a medium and high ranking, respectively, of the case prioritization model. Similarly, segment 17 of the case segmentation model corresponds with low to high rankings of the case prioritization model. These portions may be identified with the option to provide customers falling in these portions with a proactive outbound campaign and proactively direct such customers directly to a Member Loyalty department or customer relations department of the insurance provider. These high probability situations of generating a case may be predicted and proactive actions may be provided to reduce the number of cases generated.

Figure 23:
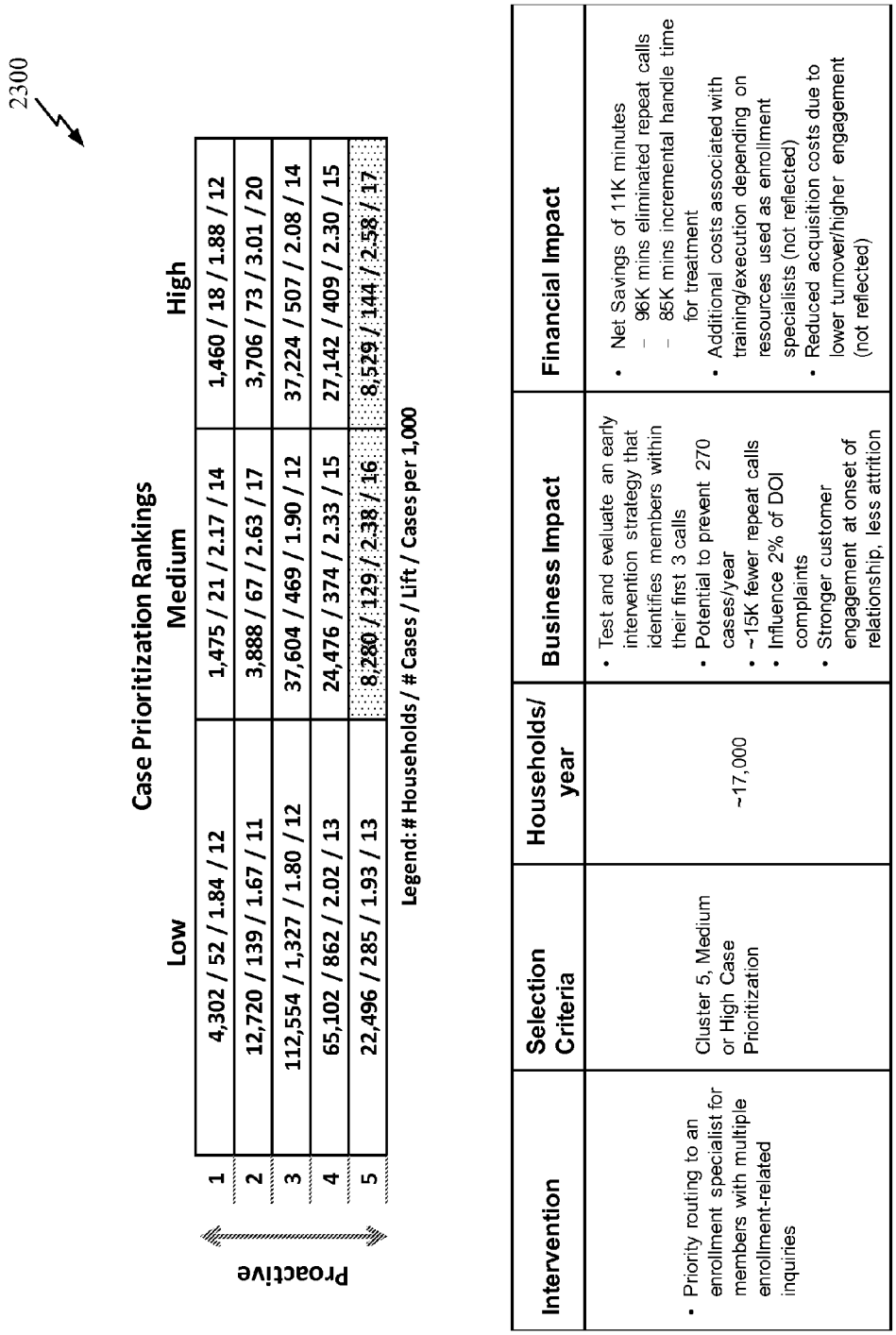

Referring to FIG. 23, a third option is to provide priority routing of customers directly to an enrollment specialist of the insurance provider. A table 2300 illustrated in FIG. 23, demonstrates that segment 5 of the case segmentation model has two portions that correspond with a medium and high ranking, respectively, of the case prioritization model. These portions may be identified with the option to proactively provide priority routing to an enrollment specialist for customers with multiple enrollment-related inquiries. These situations may be predicted and proactive actions may be provided to reduce the number of cases generated.

In the example(s) described herein, by implementing the intervention options described above, it is be possible to re-invest handle time from repeat calls into relationship building interactions, touch about 90 thousand households per year with a high probability of generating a case, prevent about 1,500 cases from being generated per year (a 7.5% reduction), influence more than 10% of Department of Insurance (DOI) complaints, and eliminate about 85 thousand repeat calls and save roughly 225 thousand minutes per year.

The models described herein may be running in real time and also integrate claims data into the process. Thus, when a customer calls or initiates an interaction with the insurance provider, the interaction with the customer may be automatically categorized through the model and one or more proactive actions may be implemented to enhance the customer experience and efficiently address the customer's inquiry without issue.

As the systems and methods are implemented, successful interventions and actions reduce the volume of households in high call volume clusters. As those high risk/high volume clusters shrink, the framework naturally evolves to focus on earlier intervention.

While, the systems and methods are described and illustrated in the context of insurance providers and call centers of insurance providers, the systems and methods may be implemented in other types of organizations to improve customer interactions, customer satisfaction, customer experience, etc., and reduce costs.

Access to the systems and methods disclosed herein may be sold and/or provided as a product to healthcare Health Information Exchanges (HIE's), Regional Health Information Organizations (RHIO's), Accountable Care Organizations (ACO's), providers, payers, employers, states, and other healthcare organizations, for example.

Aspects of the present disclosure contain elements and/or combination of elements that transform information from a variety of sources and in a variety of different formats into processed data in one or more data storage systems. The processed data is configured for accessibility by one or more computer processors to dynamically and substantially instantaneously provide proactive actionable results based on the data.

Aspects of the present disclosure improve the particular technical environment of predictive information technology by allowing prediction of customer interactions from a variety of sources in which disparate formatting among the sources are accommodated in a pre-processed compilation of stored data. The pre-processing renders the data accessible in real time for display of proactive actionable results on a user interface. A data model is configured to efficiently display useful combinations of proactive actionable results for individual customers and/or populations of customers. Aspects of the present disclosure improve the operation of certain customer interaction organizations, dashboards, machines, networks and/or systems by generating a processed form of information including real-time representations of customer interactions, thereby improving the quality of customer care and experience, and reducing costs. Certain aspects of the present disclosure may be confined to the field of health information technology, in which they provide substantial improvement and technological innovation.

In various embodiments, software may be stored in a computer program product and/or loaded into a special purpose computer system using removable storage drive, hard disk drive or communications interface. Aspects of the disclosed process may be implemented in control logic or computer program instructions, which when executed causes the special purpose computer system to perform the functions of various embodiments as described herein. Implementation of system including special purpose machines to perform the functions described herein will be apparent to persons skilled in the relevant art(s).

The systems, machines and processes described herein may be used in association with web services, utility computing, pervasive and individualized computing, security and identity systems and methods, autonomic computing, cloud computing, commodity computing, mobility and wireless systems and methods, open source, biometrics, grid computing and/or mesh computing.

Databases discussed herein are generally implemented on special purpose machines, systems and/or networks to ensure privacy of confidential health information and data security is preserved in accordance with industry standards and government regulations. The databases may include relational, hierarchical, graphical, or object-oriented structure and/or other database configurations. Moreover, the databases may be organized in various manners, for example, as data tables or lookup tables. In addition to the inventive techniques for combining health information with social media information disclosed herein, association of certain data may be accomplished through various data association technique such as those known or practiced in the art. One skilled in the art will also appreciate that databases, systems, devices, servers or other components of the disclosed systems or machines may consist of any combination thereof at a single location or at multiple locations, wherein each database, system or machine may include of suitable security features, such as firewalls, access codes, encryption, decryption, compression, decompression, and/or the like. The special purpose systems, networks and/or computers discussed herein may provide a suitable website or other Internet-based graphical user interface which is accessible by users.

Functional blocks of the block diagrams and flowchart illustrations support combinations of means for performing the specified functions, combinations of steps for performing the specified functions, and program instruction means for performing the specified functions. It should be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The following definitions are intended to be exemplary and illustrative, not necessarily limiting:

The terms "member", "consumer", "employee", "insured", "patient", and variants thereof, generally refer to any person or family unit with respect to whom seeks or obtains healthcare insurance and receives healthcare services from providers. The term member can include any person in the covered family unit or other group.

The terms "payer", "employer", "insurer", "insurance provider" and variants thereof, generally refer to any entity, such as an employer of the member, or an insurance or reinsurance provider or company, or government entity responsible for paying a substantial fraction of healthcare costs (excluding "co-pay" amounts generally assessed against the member), or otherwise subject to economic harm from member health problems (such as an organization that would suffer from the member's absence).

The terms "insurance", "insurance benefits", "health insurance", and variants thereof, generally refer to any benefit, such as payment for provider services (excluding "co-pay" amounts generally assessed against the member), including without limitation a negotiated lower rate for provider services, payment for most of the cost of provider services, provider services offered at no cost to the member to encourage healthy behavior, and otherwise.

The terms "provider", "medical personnel", "doctor", "hospital", "laboratory technician", "nurse", "physical therapist", "facility", and variants thereof, generally refer to any provider of one or more healthcare services.

The terms "healthcare", "healthcare services", "medical procedure", "office visit", "therapy", and variants thereof, generally refer to provision of healthcare services. The concept and scope of healthcare activities is intended to be broad, and can include medical and dental activity, nutrition advice and exercise coaching, mental health services and counseling, physical therapy, chiropractic, acupuncture, aromatherapy, other non-Western therapies, and other therapies, and includes promoting periodic and a periodic checkups (such as prenatal and well baby care), healthy diet, regular exercise, and age-appropriate and gender-appropriate testing.

Although illustrative embodiments of the present disclosure have been described herein with reference to the accompanying drawings, it is to be understood that the present disclosure is not limited to those precise embodiments, and that various other changes and modifications may be made by one skilled in the art without departing from the scope or spirit of the disclosure.

Additional features and advantages of the present disclosure are described below. It should be appreciated by those skilled in the art that this disclosure may be readily utilized as a basis for modifying or designing other structures, systems and processes for carrying out the same purposes of the present disclosure. It should also be realized by those skilled in the art that such equivalent implementations do not depart from the teachings of the disclosure as set forth in the appended claims. The novel features, which are believed to be characteristic of the disclosure, both as to its organization and method of operation, together with further objects and advantages, will be better understood from the present description when considered in connection with the accompanying figures. It is to be expressly understood, however, that each of the figures is provided for the purpose of illustration and description only and is not intended as a definition of the limits of the present disclosure.

What is claimed is:

1. A customer interface method, comprising:
   identifying a plurality of customer interaction types in a data set, the data set including customer interaction data and customer demographic data;
   identifying a plurality of customer demographic types in the data set;
   correlating the customer interaction types with the customer demographic types;
   computing a probability that a future customer interaction will result in generation of an escalation based on the correlating of the customer interaction types with the customer demographic types, escalation occurring when a customer contacting an organization is transferred by a first representative to a second representative or to a different organizational group, after the first representative is unable to resolve an issue of the customer, and
   proactively altering routing of an interaction with a new customer directly to the second representative or to the different organizational group based at least in part on the probability to avoid the escalation of the interaction from the first representative.

2. The method of claim 1, comprising:
   matching a new customer demographic type of the new customer with one or more of the customer demographic types; and
   predicting a customer interaction type of the new customer based at least in part on the new customer demographic type and the probability.

3. The method of claim 2, wherein proactively altering the routing of the interaction is based on the predicted customer interaction type.

4. The method of claim 2, further comprising:
   identifying one or more customers who are associated with the customer interaction type of the new customer; and
   identifying customer interaction data in the data set corresponding to the one or more identified customers,
   wherein predicting the customer interaction type of the new customer is further based at least in part on the identified customer interaction data.

5. The method of claim 2, wherein the data set further includes one or more of customer clinical data, customer treatment data, and customer activities data, the method further comprising:
   identifying key customer activity based attributes in the data set that define segments of customer interaction types, wherein each segment includes one or more of the customer interaction types; and
   identifying one or more of the key customer activity based attributes associated with the new customer,
   wherein predicting the customer interaction type of the new customer is further based at least in part on the key customer activity based attributes.

6. The method of claim 1, wherein the data set further includes one or more of customer clinical data, customer treatment data, and customer activities data, the method further comprising:
   identifying key customer activity based attributes in the data set that define segments of the customer interaction types, wherein each segment includes one or more of the customer interaction types;

identifying one or more customers based at least in part on the key customer activity based attributes associated with the identified customers; and predicting a likelihood of a future customer interaction associated with the identified customers based at least in part on the key customer activity based attributes.

7. The method of claim 6, further comprising:

proactively initiating an interaction with the identified customers based on the predicted likelihood of the future customer interaction associated with the identified customers.

8. A customer interface method, comprising:

identifying a plurality of customer interaction attributes in a data set, the data set including customer interaction data and customer demographic data;

analyzing the plurality of customer interaction attributes, including determining a mean or median of a correlation of each of the plurality of customer interaction attributes resulting in generation of an escalation, escalation occurring when a customer contacting an organization is transferred by a first representative to a second representative or to an organizational group, after the first representative is unable to resolve an issue of the customer;

identifying a plurality of customer interaction metrics defining a plurality of segments of customer interaction types based at least in part on the analyzed plurality of customer interaction attributes, each of the plurality of segments comprising one or more of the customer interaction attributes;

computing a probability that a customer interaction of a future customer will correspond to one or more of the segments of customer interaction types, the probability providing a likelihood that the customer interaction will result in an escalation; and proactively altering routing of an interaction with a new customer directly to the second representative or to the organizational group based at least in part on the probability to avoid the escalation of the interaction from the first representative.

9. The method of claim 8, further comprising:

identifying one or more customers based at least in part on the customer interaction metrics associated with the identified customers;

predicting a likelihood of a future customer interaction associated with the identified customers based at least in part on the customer interaction metrics; and proactively initiating an interaction with the identified customers based on the predicted likelihood of the future customer interaction associated with the identified customers.

10. The method of claim 8, further comprising:

identifying one or more of the plurality of customer interaction attributes associated with the new customer; and predicting a customer interaction type of the new customer based at least in part on the segments of customer interaction types.

11. The method of claim 8, wherein the identifying the plurality of customer interaction metrics defining the plurality of segments of customer interaction types includes:

combining one or more of the plurality of customer interaction attributes to define at least one of the plurality of segments of customer interaction types.

12. The method of claim 11, further comprising:

determining probabilities that correspond to each respective segment of the plurality of segments of customer interaction types, wherein the probabilities relate to the likelihood that the customer interaction will result in generation of an escalation.

13. A customer interface method, comprising:

identifying a plurality of customer demographic attributes in a data set, the data set including customer interaction data and customer demographic data;

analyzing the plurality of customer demographic attributes, including determining a percentage of each of the plurality of customer demographic attributes resulting in generation of an escalation, escalation occurring when a customer contacting an organization is transferred by a first representative to a second representative or to an organizational group, after the first representative is unable to resolve an issue of the customer;

identifying a plurality of customer interaction metrics defining a plurality of segments of customer interaction types based at least in part on the analyzed plurality of customer demographic attributes, each of the plurality of segments comprising one or more of the customer demographic attributes;

computing a probability that a customer interaction of a future customer will correspond to one or more of the segments of customer interaction types, the probability providing a likelihood that the customer interaction will result in an escalation; and proactively altering routing of an interaction with a new customer directly to the second representative or to the organizational group based at least in part on the probability to avoid the escalation of the interaction from the first representative.

14. The method of claim 13, comprising:

identifying one or more customers based at least in part on the customer interaction metrics associated with the identified customers;

predicting a likelihood of a future customer interaction associated with the identified customers based at least in part on the customer interaction metrics; and proactively initiating an interaction with the identified customers based on the predicted likelihood of the future customer interaction associated with the identified customers.

15. The method of claim 13, further comprising:

identifying one or more of the plurality of customer demographic attributes associated with the new customer; and predicting a customer interaction type of the new customer based at least in part on the segments of customer interaction types.

16. The method of claim 13, further comprising:

determining probabilities that correspond to each respective segment of the plurality of segments of customer interaction types, wherein the probabilities relate to the likelihood the customer interaction will result in generation of an escalation.

17. The method of claim 1, wherein the identifying of the plurality of customer interaction types comprises identifying the plurality of customer interaction types in the data set using a decision tree model.

18. The method of claim 2, wherein correlating the customer interaction types with the customer demographic types comprises:

prioritizing customers into risk groups based on the customer demographic types attributed to each customer, each risk groups corresponding to a likelihood that an escalation will occur; and determining, for each customer interaction type, a number of customers in each risk group.

* * * * *